US012560264B2

(12) United States Patent
Martin et al.

(10) Patent No.: US 12,560,264 B2
(45) Date of Patent: ***Feb. 24, 2026

(54) FLUID COUPLINGS

(71) Applicant: Colder Products Company, Roseville, MN (US)

(72) Inventors: Jeffrey Jonathan Martin, Robbinsdale, MN (US); Ingo Mohr, Wiesbaden (DE)

(73) Assignee: Colder Products Company, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,531

(22) Filed: Mar. 2, 2023

(65) Prior Publication Data

US 2023/0204139 A1     Jun. 29, 2023

Related U.S. Application Data

(63) Continuation of application No. 17/331,905, filed on May 27, 2021, now Pat. No. 11,635,162.

(60) Provisional application No. 63/150,406, filed on Feb. 17, 2021, provisional application No. 63/038,423, filed on Jun. 12, 2020.

(51) Int. Cl.
| | |
|---|---|
| *F16L 37/084* | (2006.01) |
| *F16L 37/098* | (2006.01) |
| *F16L 37/34* | (2006.01) |
| *F16L 37/35* | (2006.01) |
| *F16L 37/42* | (2006.01) |

(52) U.S. Cl.
CPC ....... *F16L 37/0841* (2013.01); *F16L 37/0985* (2013.01); *F16L 37/34* (2013.01); *F16L 37/35* (2013.01); *F16L 37/42* (2013.01); *F16L 2201/44* (2013.01)

(58) Field of Classification Search
CPC ....... F16L 37/0841; F16L 37/34; F16L 37/42; F16L 37/35; F16L 37/0985
See application file for complete search history.

(56) References Cited

U.S. PATENT DOCUMENTS

| | | | | |
|---|---|---|---|---|
| 2,310,073 A | * | 2/1943 | Hutchison | F16L 37/12 |
| | | | | 137/899.2 |
| 2,319,015 A | * | 5/1943 | Speth | F16L 29/04 |
| | | | | 137/614.03 |

(Continued)

FOREIGN PATENT DOCUMENTS

| | | |
|---|---|---|
| EP | 2626612 | 8/2013 |
| FR | 2957399 | 9/2011 |

(Continued)

OTHER PUBLICATIONS

International Search Report and Written Opinion in International Appln. No. PCT/US2021/34419, dated Aug. 30, 2021, 11 pages.

(Continued)

*Primary Examiner* — David Colon-Morales
(74) *Attorney, Agent, or Firm* — Fish & Richardson P.C.

(57) ABSTRACT
Some fluid coupling devices described herein are configured for use in fluid systems for purposes of providing a sterile connection for drug delivery. In some embodiments, the fluid coupling devices can be implemented as multi-use, sterile fluid coupling devices that are configured to reduce the likelihood of fluid spillage when being disconnected.

20 Claims, 17 Drawing Sheets

(56) References Cited

U.S. PATENT DOCUMENTS

| | | | | | |
|---|---|---|---|---|---|
| 2,457,251 | A | * | 12/1948 | Main, Jr. | F16L 37/34 |
| | | | | | 137/614.04 |
| 2,545,796 | A | * | 3/1951 | Scheiwer | F16L 37/23 |
| | | | | | 137/614.04 |
| 3,120,968 | A | | 2/1964 | Calvin | |
| 3,613,726 | A | * | 10/1971 | Torres | F16L 37/23 |
| | | | | | 285/86 |
| 4,086,939 | A | | 5/1978 | Wilcox et al. | |
| 4,219,048 | A | * | 8/1980 | Ekman | F16L 37/34 |
| | | | | | 137/614.04 |
| 4,429,713 | A | * | 2/1984 | Walter | F16L 37/34 |
| | | | | | 251/149.8 |
| 4,819,908 | A | | 4/1989 | Norkey | |
| 4,934,655 | A | | 6/1990 | Blenkush et al. | |
| 4,949,745 | A | * | 8/1990 | Mckeon | F16L 37/23 |
| | | | | | 137/15.09 |
| 5,143,347 | A | | 9/1992 | Lee et al. | |
| 5,211,197 | A | * | 5/1993 | Marrison | F16L 37/35 |
| | | | | | 251/149.6 |
| 5,316,041 | A | | 5/1994 | Ramacier et al. | |
| 5,365,972 | A | * | 11/1994 | Smith, III | F16L 37/35 |
| | | | | | 137/614.04 |
| 5,482,083 | A | * | 1/1996 | Jenski | F16L 37/35 |
| | | | | | 285/307 |
| 5,494,073 | A | * | 2/1996 | Saito | F16L 37/34 |
| | | | | | 251/149.6 |
| 5,546,985 | A | * | 8/1996 | Bartholomew | F16L 37/34 |
| | | | | | 251/149.6 |
| 5,820,614 | A | * | 10/1998 | Erskine | F16L 55/1007 |
| | | | | | 604/905 |
| 5,845,943 | A | | 12/1998 | Ramacier et al. | |
| 5,911,403 | A | | 6/1999 | deCler et al. | |
| 6,024,124 | A | | 2/2000 | Braun et al. | |
| 6,082,401 | A | * | 7/2000 | Braun | F16L 37/0841 |
| | | | | | 137/614.04 |
| 6,161,578 | A | * | 12/2000 | Braun | F16L 37/35 |
| | | | | | 137/614.04 |
| 6,168,137 | B1 | * | 1/2001 | Paradis | A61M 39/26 |
| | | | | | 251/149.6 |
| 6,231,089 | B1 | * | 5/2001 | DeCler | F16L 37/0841 |
| | | | | | 285/308 |
| 6,382,593 | B1 | | 5/2002 | deCler et al. | |
| 6,655,498 | B1 | * | 12/2003 | Sasa | F01M 11/0408 |
| | | | | | 184/105.3 |
| 6,893,055 | B2 | * | 5/2005 | Thomas | F16L 37/084 |
| | | | | | 285/369 |

| | | | | | |
|---|---|---|---|---|---|
| 7,284,774 | B2 | * | 10/2007 | Bauer | F16L 37/0985 |
| | | | | | 285/308 |
| 7,401,627 | B2 | * | 7/2008 | Magnus | F16L 37/34 |
| | | | | | 251/149.6 |
| 7,469,472 | B2 | | 12/2008 | deCler et al. | |
| 7,762,525 | B2 | * | 7/2010 | Smith, III | E21B 33/038 |
| | | | | | 137/614.04 |
| 7,770,938 | B2 | * | 8/2010 | Bauer | F16L 37/0985 |
| | | | | | 285/308 |
| 7,984,931 | B2 | * | 7/2011 | Kertesz | F16L 37/0885 |
| | | | | | 285/308 |
| 8,196,606 | B2 | * | 6/2012 | Kitagawa | F16L 37/34 |
| | | | | | 251/149.6 |
| 8,764,068 | B2 | * | 7/2014 | Frick | F16L 37/62 |
| | | | | | 285/308 |
| 8,888,758 | B2 | * | 11/2014 | Mansour | A61M 39/22 |
| | | | | | 604/533 |
| 9,291,294 | B2 | * | 3/2016 | Lehmann | F16L 37/113 |
| 9,395,026 | B2 | * | 7/2016 | Brand | F16L 37/34 |
| 9,708,173 | B2 | | 7/2017 | Ballard et al. | |
| 9,810,360 | B2 | | 11/2017 | Lemay et al. | |
| 9,823,891 | B2 | * | 11/2017 | Duchenij | G09G 3/16 |
| 9,933,094 | B2 | * | 4/2018 | Fangrow | A61M 39/1011 |
| 10,253,911 | B1 | * | 4/2019 | Quang | F16L 37/123 |
| 10,487,967 | B2 | | 11/2019 | Gibelin et al. | |
| 10,557,580 | B2 | | 2/2020 | Mendyk | |
| 10,781,957 | B2 | | 9/2020 | Tiberghien et al. | |
| 10,808,873 | B2 | | 10/2020 | Tiberghien et al. | |
| 11,040,868 | B2 | * | 6/2021 | Peattie | B67D 7/44 |
| 11,326,727 | B2 | | 5/2022 | Sung et al. | |
| 11,635,162 | B2 | * | 4/2023 | Martin | F16L 37/0841 |
| | | | | | 285/317 |
| 2005/0101939 | A1 | * | 5/2005 | Mitchell | A61M 39/26 |
| | | | | | 604/533 |
| 2020/0063905 | A1 | | 2/2020 | Vranish | |
| 2022/0227347 | A1 | * | 7/2022 | Galant | B62L 3/023 |

FOREIGN PATENT DOCUMENTS

| | | | | | |
|---|---|---|---|---|---|
| GB | 2280238 | | 1/1995 | | |
| TW | 201137266 | A * | 11/2011 | | F16L 37/23 |
| WO | WO 9823891 | | 6/1998 | | |
| WO | WO-9823891 | A1 * | 6/1998 | | F16L 37/34 |

OTHER PUBLICATIONS

Extended European Search Report in European Appln No. 21821949.1, dated Feb. 16, 2024, 9 pages.

* cited by examiner

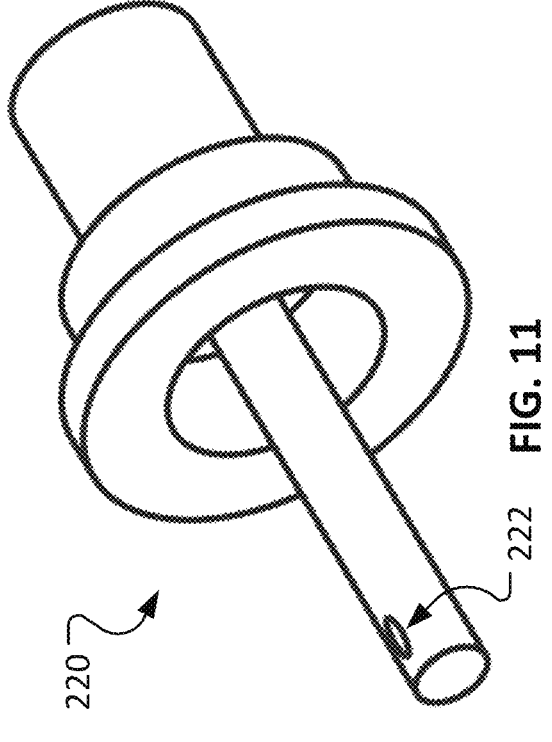
220
222 FIG. 11
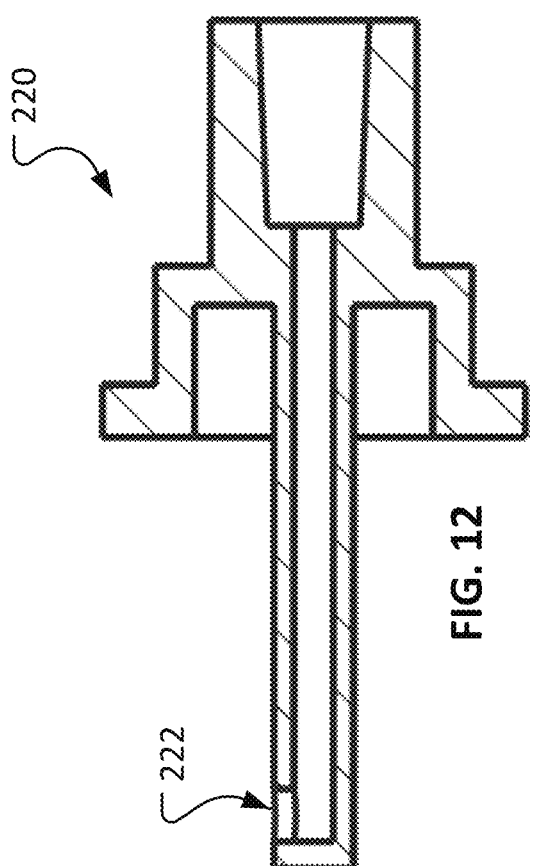
220
222
FIG. 12

750

750

FLUID COUPLINGS

CROSS-REFERENCE TO RELATED APPLICATIONS

This application is a continuation application of U.S. application Ser. No. 17/331,905 filed on May 27, 2021, which claims the benefit of U.S. Provisional Application Ser. No. 63/038,423 filed on Jun. 12, 2020, and the benefit of U.S. Provisional Application Ser. No. 63/150,406 filed on Feb. 17, 2021. The disclosures of the prior applications are considered part of (and are incorporated by reference in) the disclosure of this application.

BACKGROUND

1. Technical Field

This document relates to fluid coupling devices for fluid systems and methods of using the fluid coupling devices. For example, some embodiments described in this document relate to fluid couplings that can be used to provide a sterile connection for drug delivery.

2. Background Information

Fluid systems commonly include components such as tubing, pumps, reservoirs, fittings, couplings, heat exchangers, sensors, filters, valves, seals, and the like. Such components can be connected together in a network to define one or more fluid flow paths. Some fluid systems are open systems, meaning that the fluid flows through the network once and then exits the network. Other fluid systems are closed systems, meaning that the fluid recirculates within the network of components. Fluids may be moved through fluid systems using fluid pressure differentials. For example, in some cases, a pump or a vacuum source is used to create a pressure differential that causes the fluid to flow within the fluid system. In another example, gravity is used to cause the fluid to flow within the fluid system. In other examples, a combination of such techniques is used to cause the fluid to flow within the fluid system.

Some fluid couplings can be used in a medical context, such as for connecting a source of a therapeutic agent (or "drug") to an intravenous drug delivery system. In some cases, the steps for intravenously delivering a drug to a patient can include: (i) connecting a syringe to a bottle or vial containing a drug, (ii) transferring an amount of the drug from the bottle into the syringe, (iii) disconnecting the syringe from the bottle, (iv) connecting the syringe to an intravenous (IV) bag and/or tubing, and then (v) delivering the drug via the IV tubing to the patient.

SUMMARY

This document describes fluid coupling devices for fluid systems and methods. For example, in some embodiments this document describes fluid couplings that can be used to provide a sterile connection for drug delivery.

In some embodiments, the fluid coupling devices can be implemented as multi-use, sterile fluid coupling devices that are configured to reduce the likelihood of fluid spillage when being disconnected. The fluid coupling devices described herein also minimize dead space so that a minimal amount of fluid is retained in the coupling devices after use.

Additionally, in some such multi-use embodiments or in other embodiments, the fluid coupling devices can be configured as "sterile" or "aseptic" coupling devices in that, after the two portions of the coupling device are disconnected from each other, the fluid paths of both portions are mechanically blocked so as to inhibit biological contamination migrating into the flow paths. In some cases, "aseptic" coupling devices can additionally or alternatively mean that the fluid paths of the couplings do not become contaminated during the connection process. Such an "aseptic" coupling will also serve to limit the exposure of the fluid to the surrounding environment.

Further, in such multi-use embodiments, or other embodiments, the fluid coupling devices can be configured as no-spill coupling devices because, as the two portions of the coupling device are being disconnected from each other, one or more mechanical components will reduce the likelihood of fluid discharge out of the fluid system (for example, by blocking as such discharge paths).

In one aspect, this disclosure is directed to a fluid coupling system that includes an insert coupling and a body coupling. The insert coupling includes: (i) an insert housing defining an internal space, the insert housing having a front face and an opposite end configured for connection to a first fluid carrying component; (ii) an insert valve member slidably disposed within the internal space of the insert housing, the insert valve member including a projection; (iii) an insert seal member attached to the front face of the insert housing and defining a bore; and (iv) an insert spring disposed within the internal space of the insert housing and arranged to bias the insert valve member against the insert seal member such that the projection is within the bore. The body coupling includes: (a) a body housing defining an internal space, the body housing having a front end configured to receive a front end portion of the insert housing and an opposite end configured for connection to a second fluid carrying component; (b) a body stem extending within the internal space of the body housing, the body stem defining a central lumen and a lateral opening in fluid communication with the central lumen; (c) a body seal member slidably disposed within the internal space of the body housing, the body seal member defining a bore in which the body stem is slidably received; and (d) a body spring disposed within the internal space of the body housing and arranged to bias the body seal member to a position in which the bore of the body seal member seals the lateral opening of the body stem.

In another aspect, this disclosure is directed to another fluid coupling system. The fluid coupling includes an insert coupling and a body coupling. The insert coupling includes: (1) an insert housing defining an internal space, the insert housing having a front face and an opposite end configured for connection to a first fluid carrying component; (2) an insert seal member attached to the front face of the insert housing and defining a bore; (3) an insert stem slidably disposed within the internal space of the insert housing, the insert stem defining a central lumen and a lateral opening in fluid communication with the central lumen of the insert stem; and (4) an insert spring disposed within the internal space of the insert housing and arranged to bias the insert stem to a position in which the bore of the insert seal member seals the lateral opening of the insert stem. The body coupling includes: (A) a body housing defining an internal space, the body housing having a front end configured to receive a front end portion of the insert housing and an opposite end configured for connection to a second fluid carrying component; (B) a body stem extending within the internal space of the body housing, the body stem defining a central lumen and a lateral opening in fluid communication with the central lumen of the body stem; (C) a body seal member slidably disposed within the internal space of the body housing, the body seal member defining a bore in which the body stem is slidably received; and (D) a body spring disposed within the internal space of the body housing and arranged to bias the body seal member to a position in which the bore of the body seal member seals the lateral opening of the body stem.

Particular embodiments of the subject matter described in this document can be implemented to realize one or more of the following advantages. First, in some embodiments the fluid coupling devices provided herein are configured to facilitate a greater number of sterile connections as compared to conventional connection means (e.g., a needle piercing a silicon membrane or septum).

Second, in some embodiments, the fluid coupling devices described herein may advantageously reduce the amount of dead volume (that can contain residual fluid) in the fluid coupling system.

Third, some embodiments of the fluid coupling devices provide an improved aseptic connection and disconnection capability that may optionally reduce or eliminate the need for sterile rooms or sterile benchtop environments in some cases. As such, these embodiments of the aseptic fluid coupling devices described herein may facilitate efficient and cost-effective operations or uses that would otherwise be high-cost or even cost prohibitive in some traditional settings that required the connection and/or disconnection of particular fluid couplings in a sterile room or within a sterile flow-hood to prevent biological contamination.

Fourth, some embodiments of the fluid coupling devices provided herein are advantageously designed with a robust latching system. That is, when the two halves of the coupling are operably connected with each other, they are also mechanically latched or locked together. In some embodiments, to release the lock, two levers must be simultaneously depressed. This redundant requirement (e.g., simultaneous actuation of two levers or other actuators) for unlocking the coupling halves may reduce the likelihood of unintentional disconnections. In some embodiments, a single latch mechanism is used.

Fifth, in some embodiments the fluid couplings described herein are configured to reduce the likelihood of fluid spillage when being disconnected. Further, the fluid couplings described herein are designed to prevent the inclusion of air into the fluid, as can often result during the process of joining male and female couplings together.

Sixth, some embodiments have a smooth, unobstructed flow path.

Seventh, some embodiments do not have springs in the flow path.

In the context of this disclosure, the term "fluid" includes gases, liquids, and powders.

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. Other features, objects, and advantages of the invention will be apparent from the description and drawings, and from the claims.

4

Figures 1, 2:
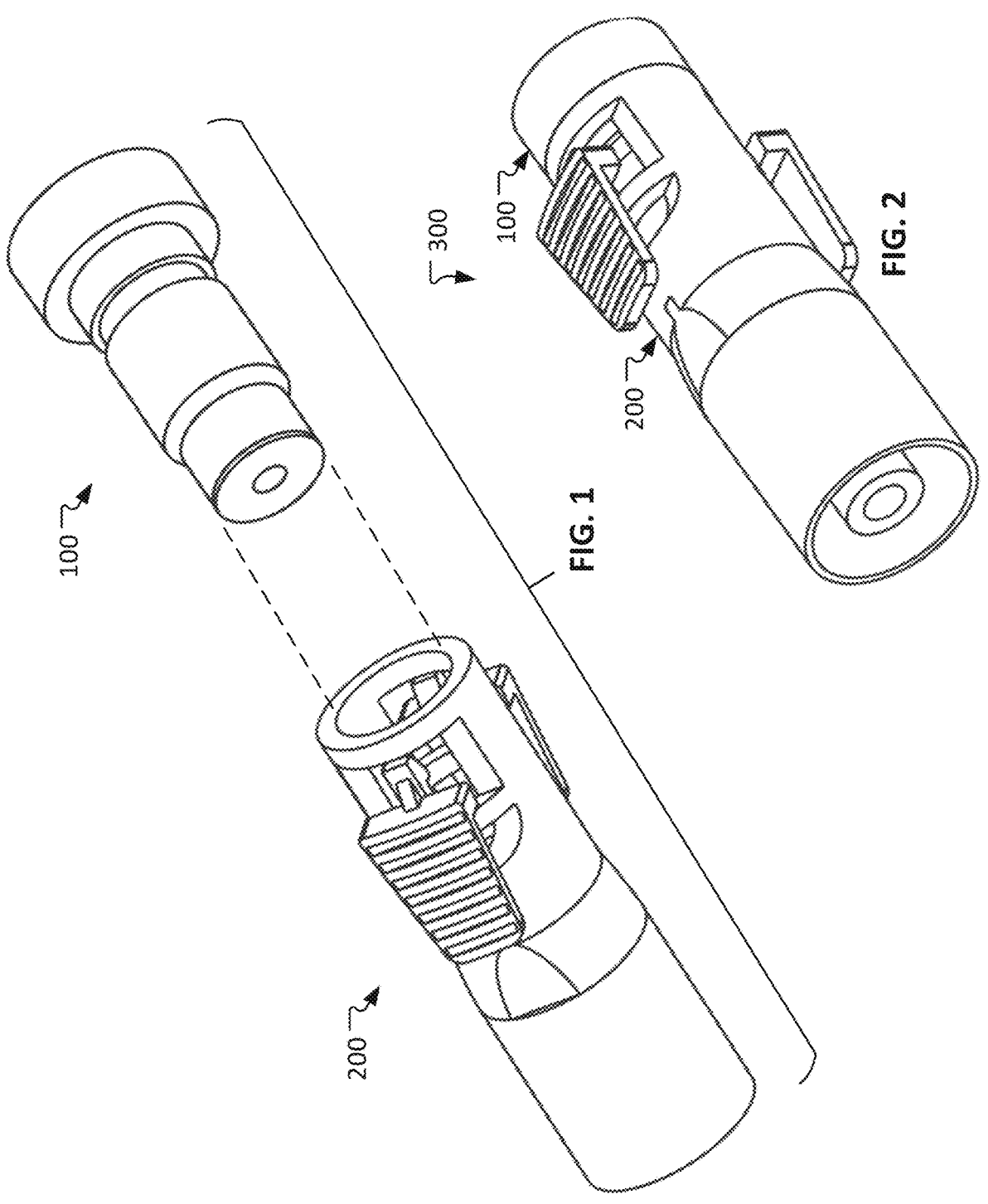
FIG. 1 is an exploded perspective view of an example fluid coupling system, in accordance with some embodiments provided herein.

FIG. 2 is perspective view of the fluid coupling system of FIG. 1 in a coupled configuration.

Figures 3, 4, 5, 6:
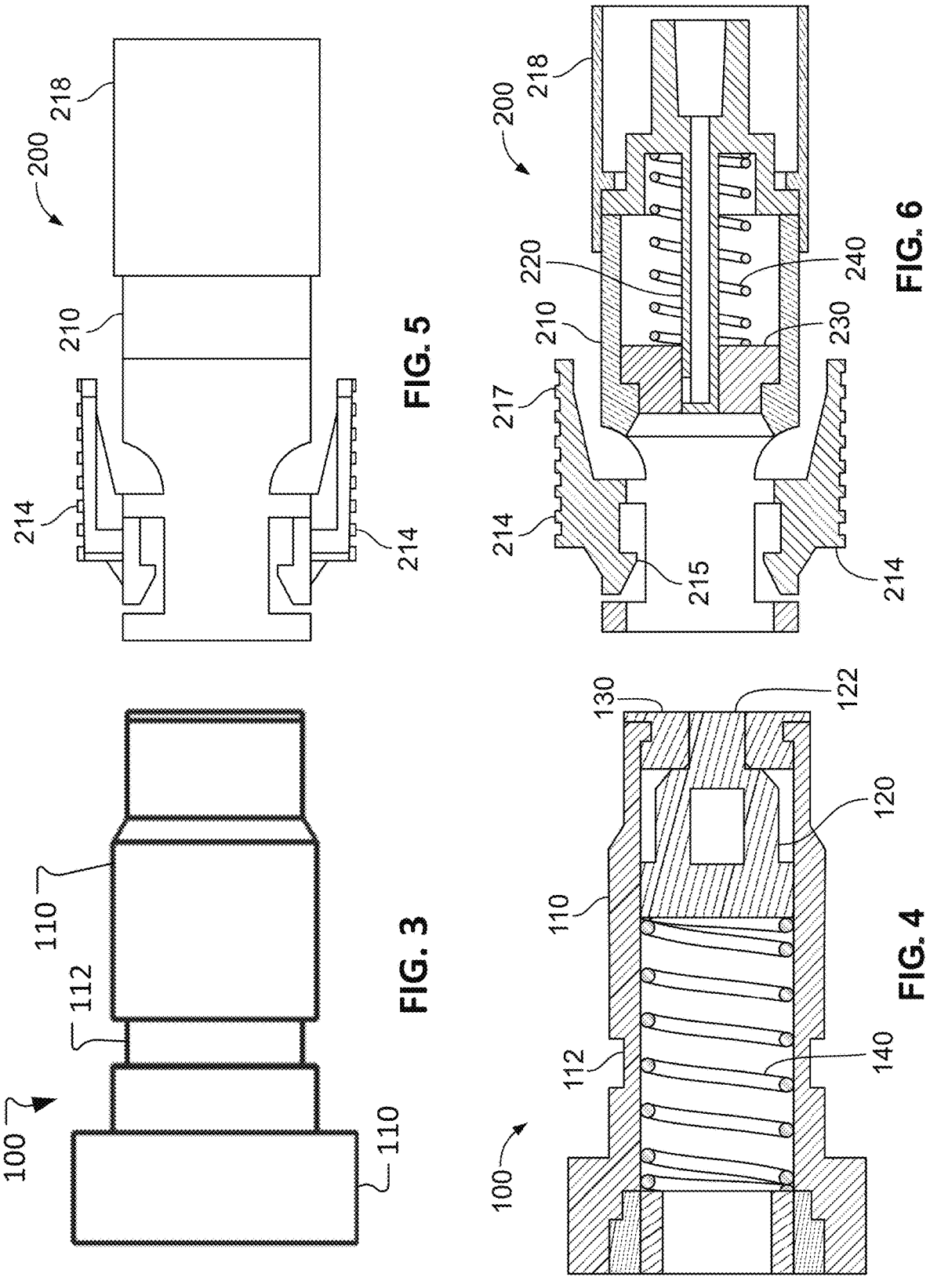

FIG. 3 is a side view an insert coupling of the fluid coupling system of FIG. 1.

FIG. 4 is a longitudinal cross-sectional view of the insert coupling of FIG. 3.

FIG. 5 is a side view a body coupling of the fluid coupling system of FIG. 1.

FIG. 6 is a longitudinal cross-sectional view of the body coupling of FIG. 5.

Figures 7, 8:
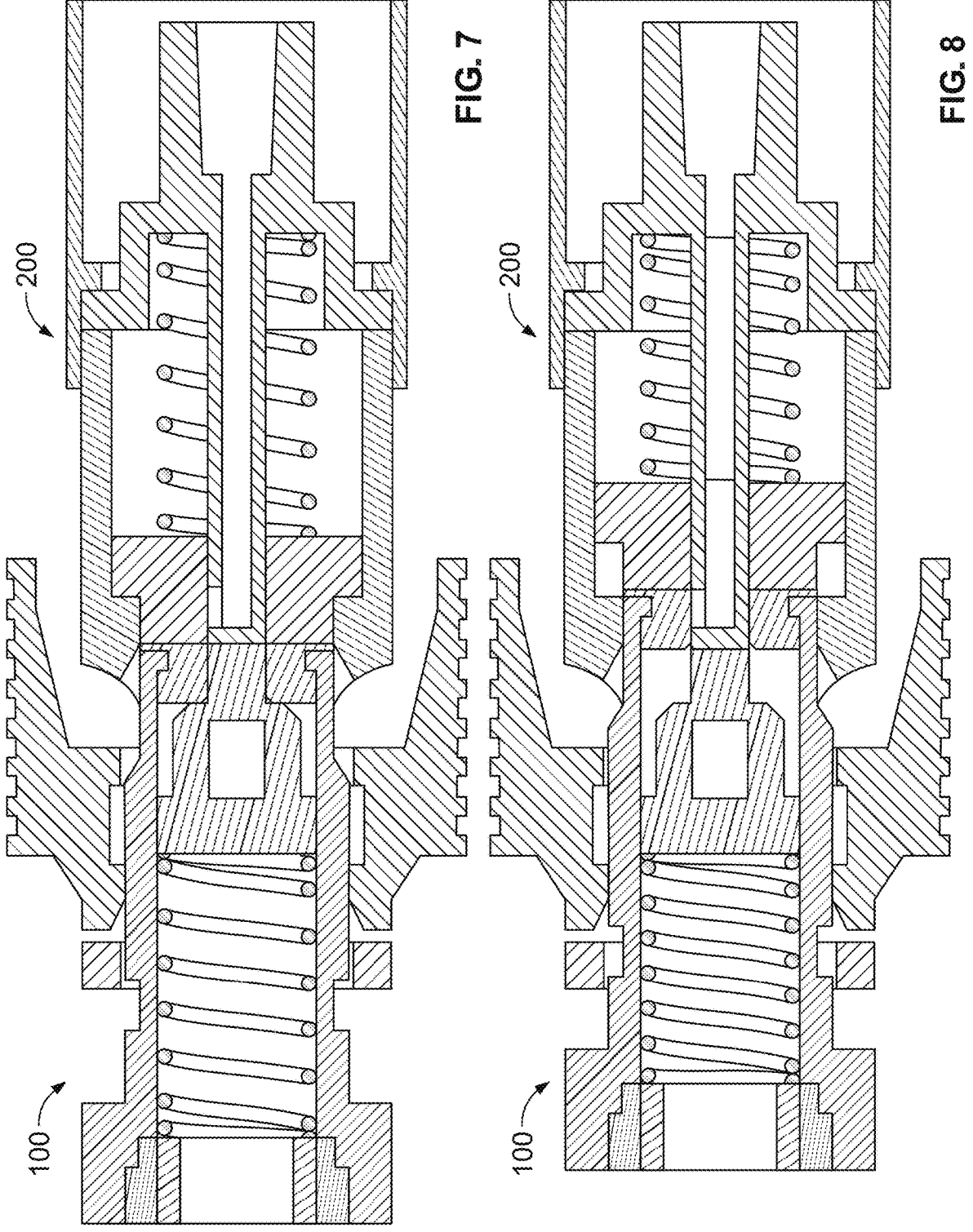

FIG. 7 is a longitudinal cross-sectional view the fluid coupling system of FIG. 1 arranged in a first pre-coupled configuration.

FIG. 8 is a longitudinal cross-sectional view the fluid coupling system of FIG. 1 arranged in a second pre-coupled configuration.

Figures 9, 10:
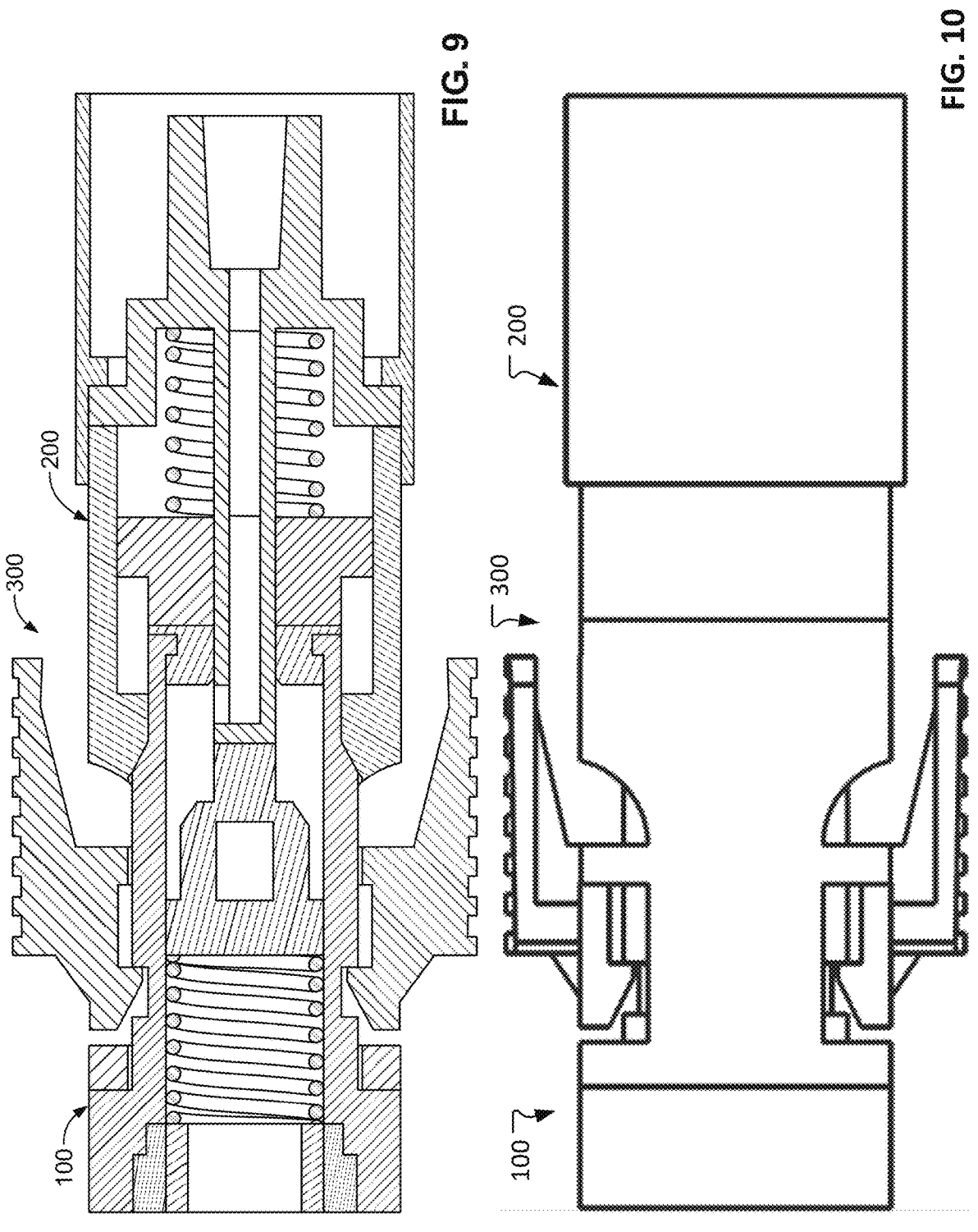

FIG. 9 is a longitudinal cross-sectional view the fluid coupling system of FIG. 1 coupled together in an operative configuration.

FIG. 10 is a side view the fluid coupling system of FIG. 1 coupled together in an operative configuration.

FIG. 11 is a perspective view of a stem member of the body coupling of the fluid coupling system of FIG. 1.

FIG. 12 is a side view of the stem member of the body coupling of the fluid coupling system of FIG. 1.

Figures 13, 14:
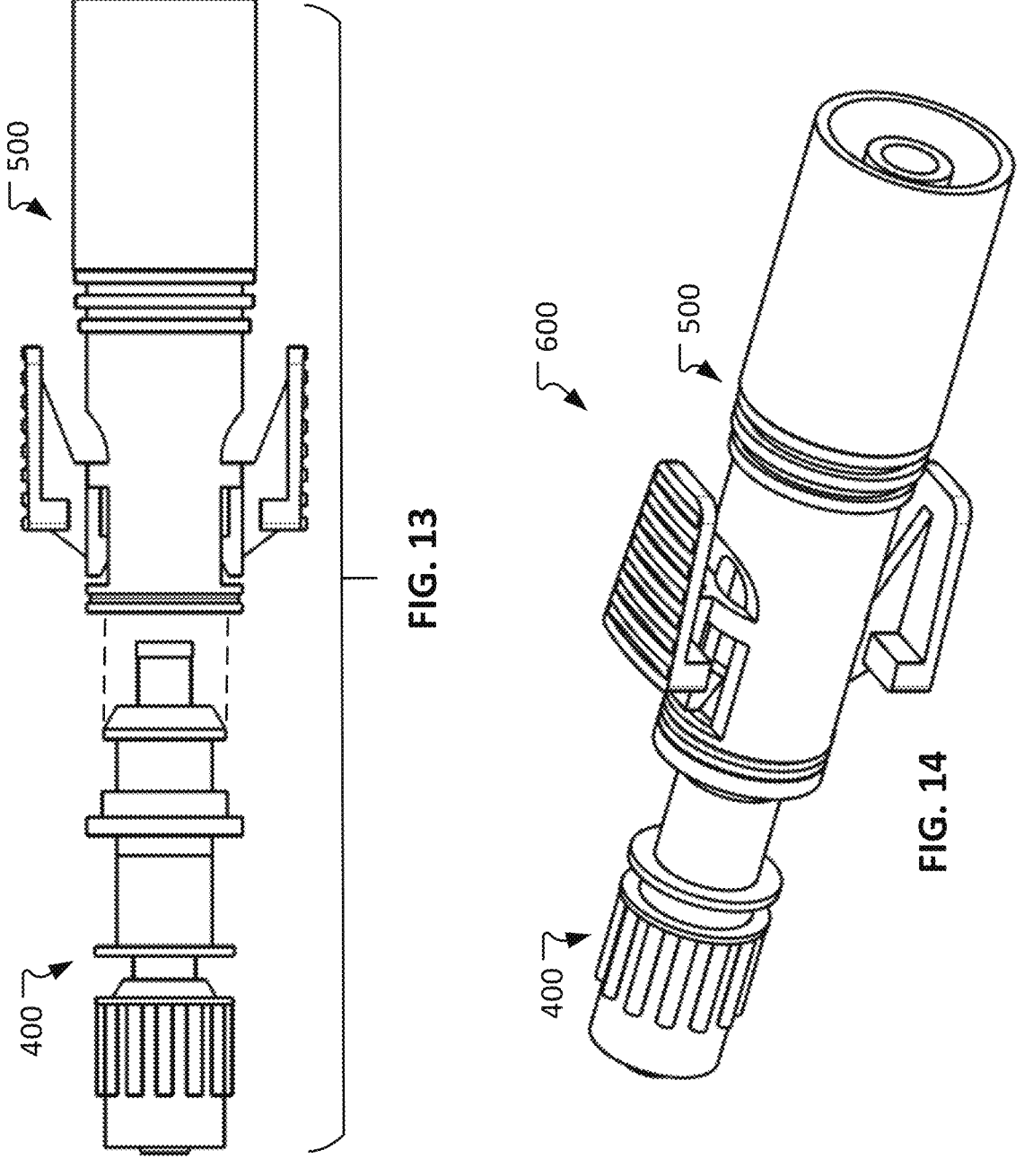

FIG. 13 is an exploded side view of another example fluid coupling system, in accordance with some embodiments provided herein.

FIG. 14 is a perspective view of the fluid coupling system of FIG. 13.

Figure 15:
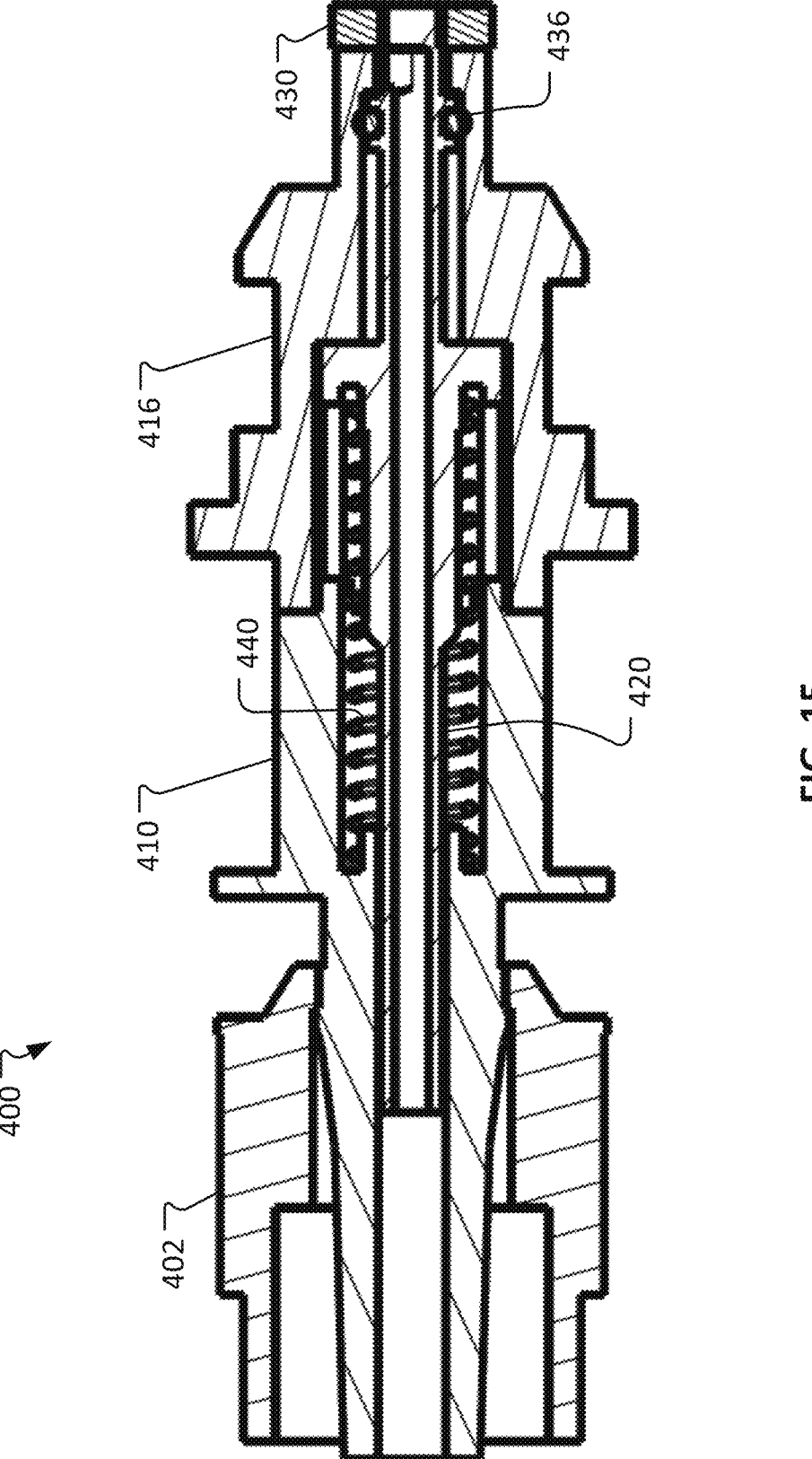

FIG. 15 is a longitudinal cross-sectional view of an insert coupling of the fluid coupling system of FIG. 13.

Figure 16:
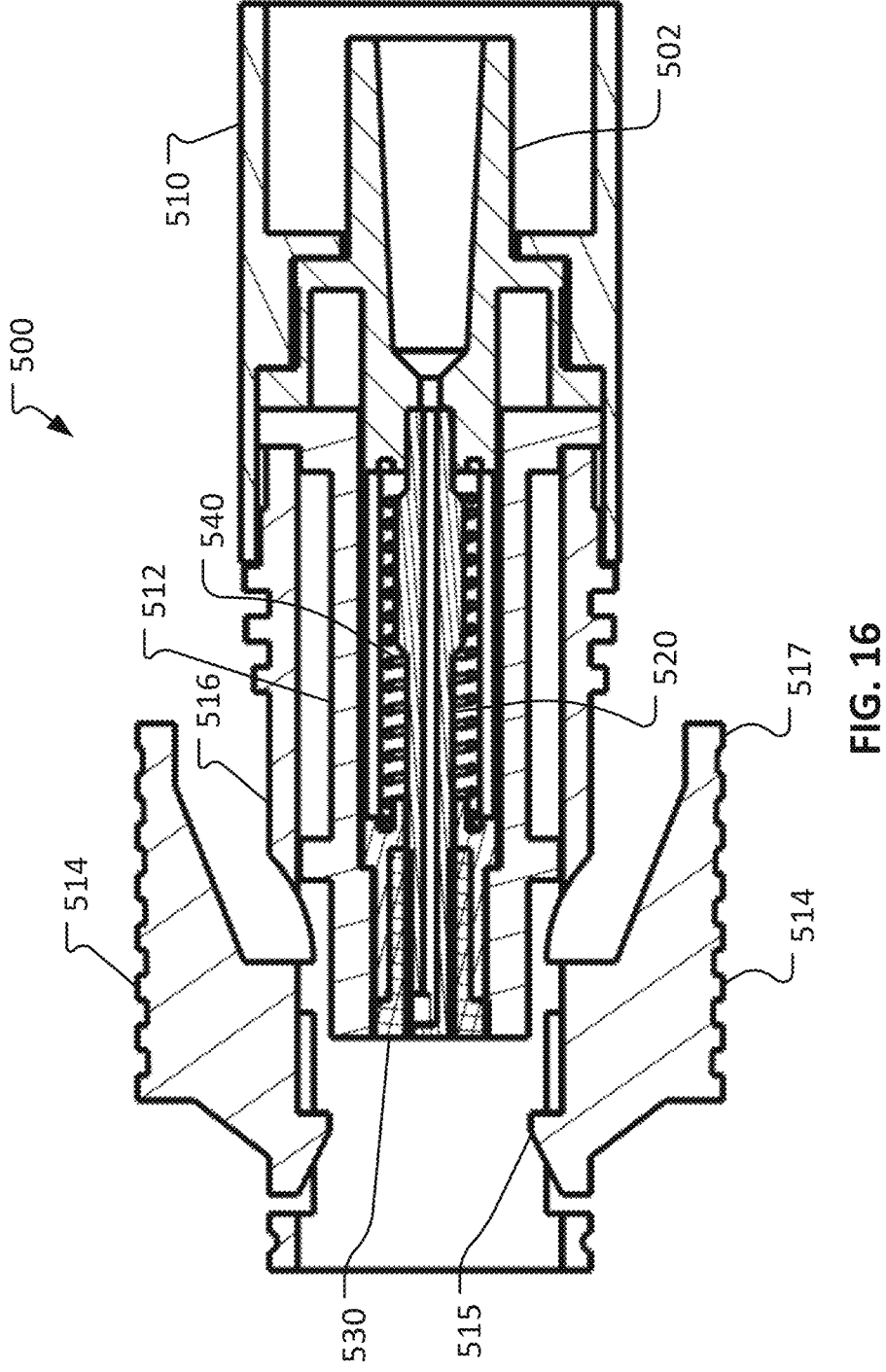

FIG. 16 is a longitudinal cross-sectional view of a body coupling of the fluid coupling system of FIG. 13.

Figures 17, 18:
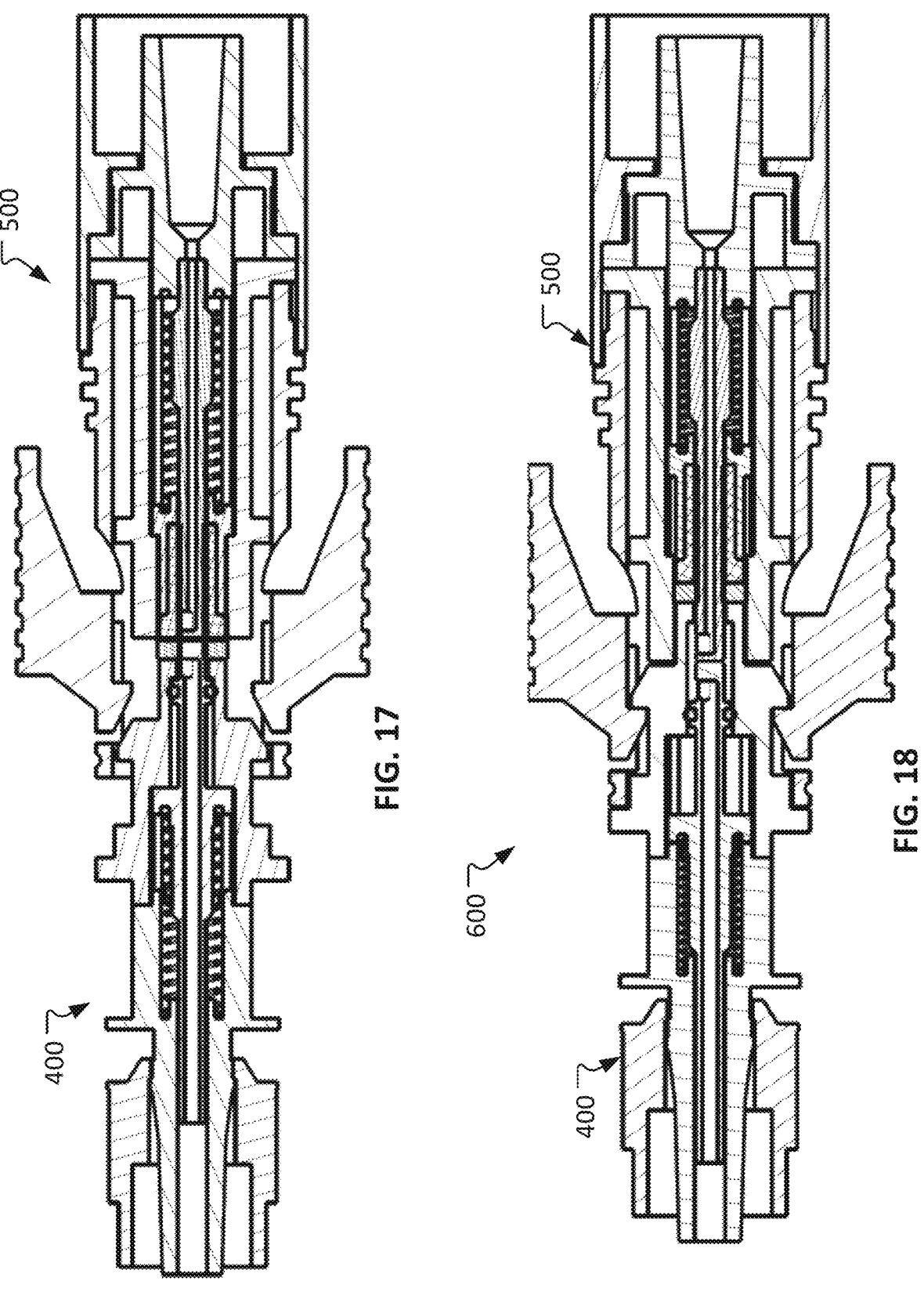

FIG. 17 is a longitudinal cross-sectional view of the insert coupling and body coupling of the fluid coupling system of FIG. 13 arranged in a first pre-coupled configuration.

FIG. 18 is a longitudinal cross-sectional view of the insert coupling and body coupling of the fluid coupling system of FIG. 13 coupled together in an operative configuration.

Figures 19, 20:
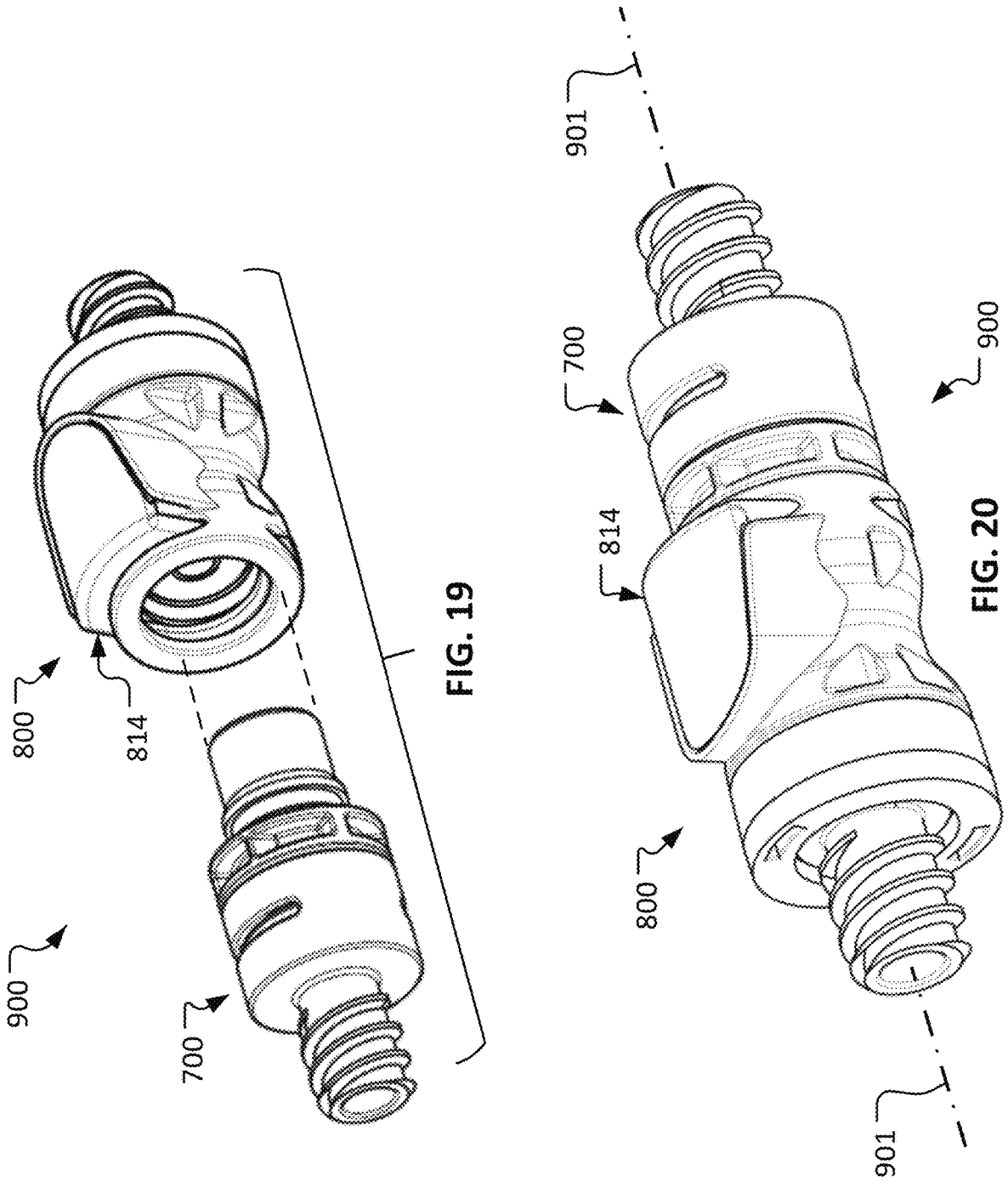

FIG. 19 is an exploded perspective view of another example fluid coupling system, in accordance with some embodiments provided herein.

FIG. 20 is a perspective view of the fluid coupling system of FIG. 19 in a coupled, operable configuration.

Figures 21, 22:
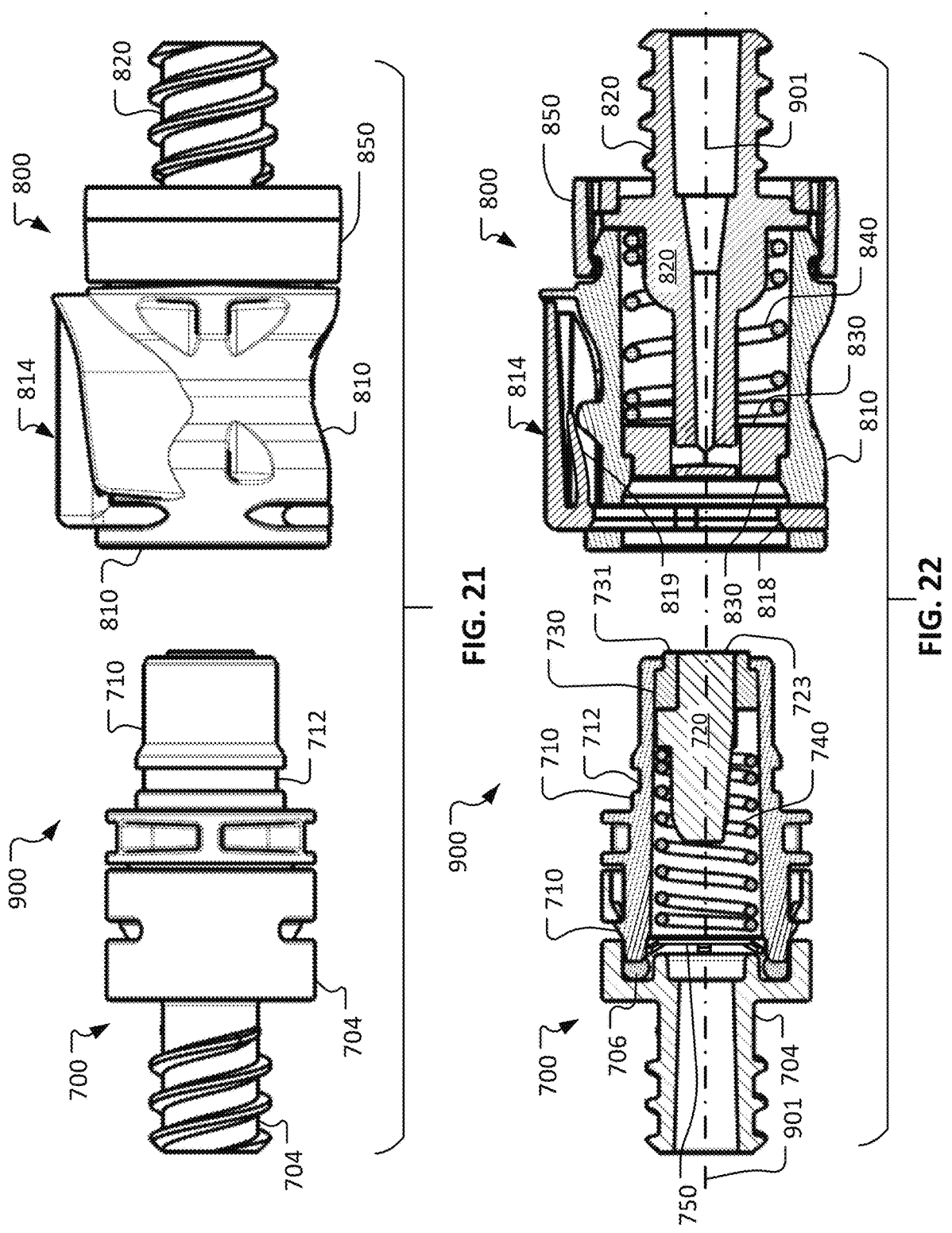

FIG. 21 is an exploded side view of the fluid coupling system of FIG. 19.

FIG. 22 is an exploded longitudinal cross-sectional side view of the fluid coupling system of FIG. 19.

Figures 23, 24:
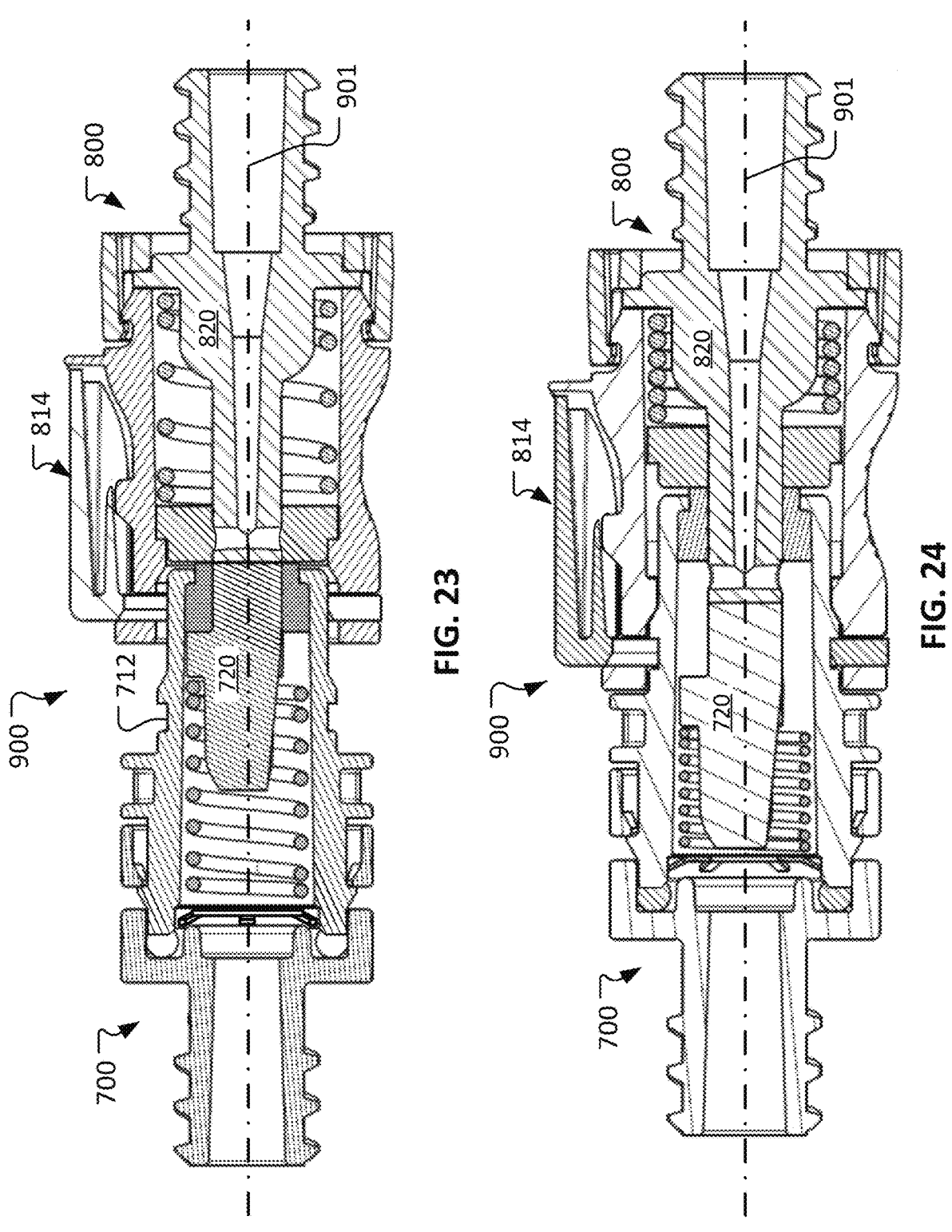

FIG. 23 is a longitudinal cross-sectional side view of the fluid coupling system of FIG. 19 in an arrangement just prior to actual engagement between the male and female couplings.

FIG. 24 is a longitudinal cross-sectional side view of the fluid coupling system of FIG. 19 in a fully coupled operative arrangement.

Figures 25, 26:
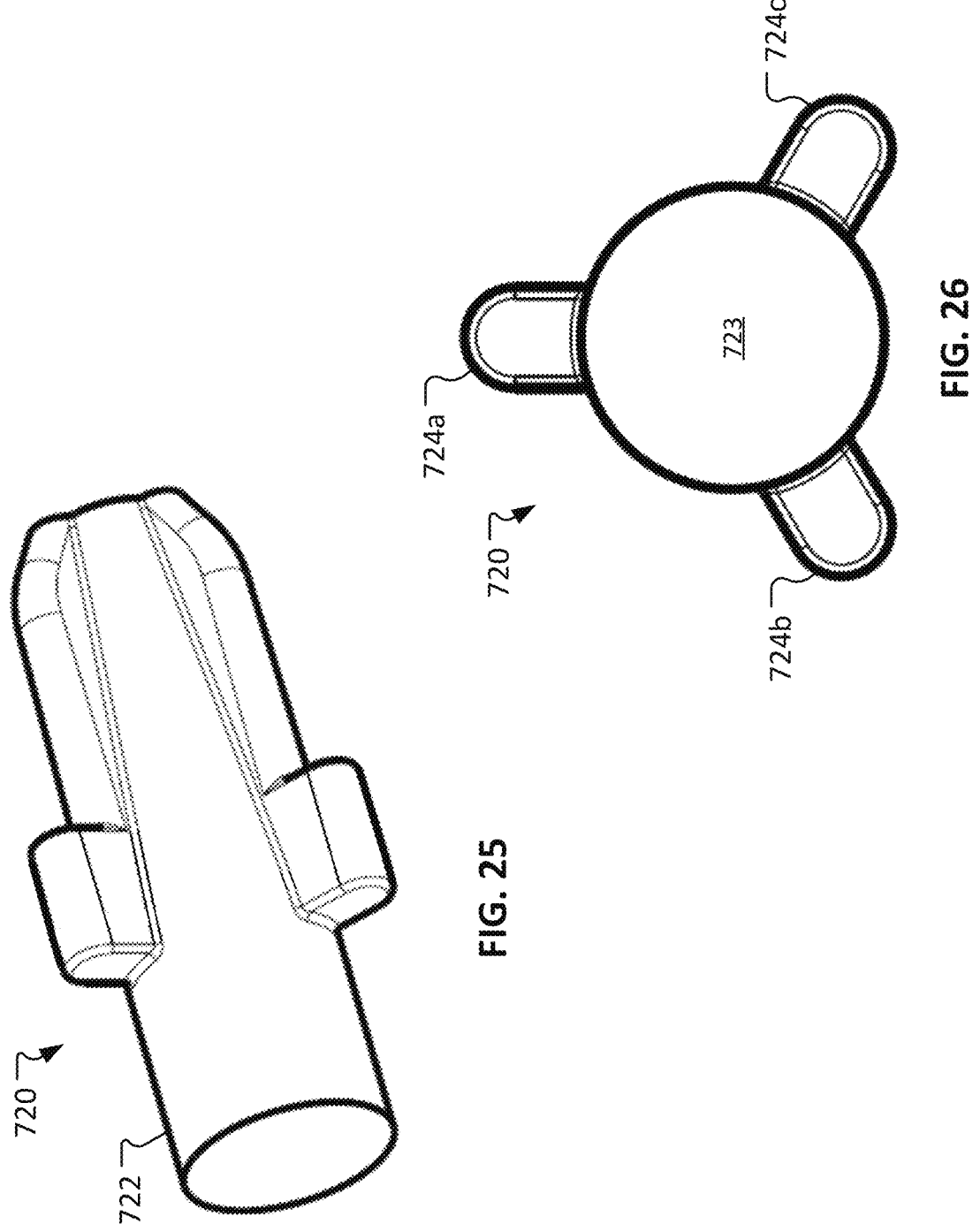

FIG. 25 is a perspective view of an example male valve member used with the male coupling of the fluid coupling system of FIG. 19.

FIG. 26 is an end view of the male valve member of FIG. 25.

Figures 27, 28, 29:
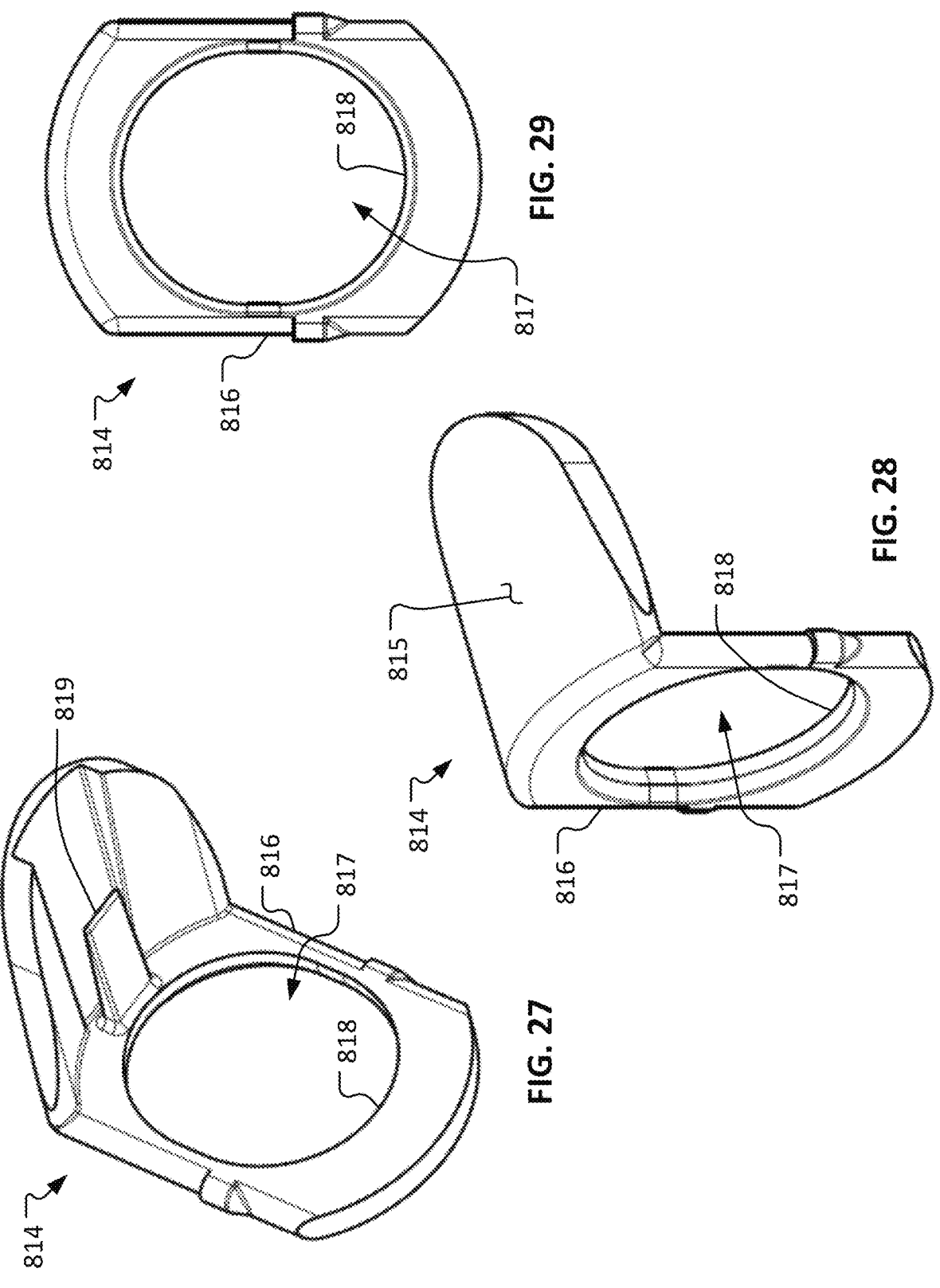

FIGS. 27-29 are various views of an example clip member used with the female coupling of the fluid coupling system of FIG. 19.

Figure 30:
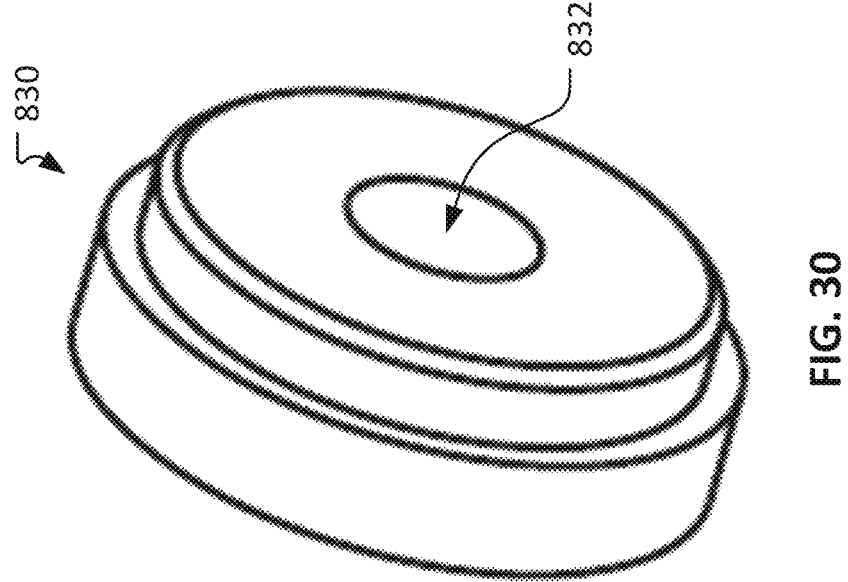

FIG. 30 is a perspective view of an example female valve member used with the female coupling of the fluid coupling system of FIG. 19.

Figure 31:

FIG. 31 is a side view of the female valve member of FIG. 30.

Figures 32, 33:
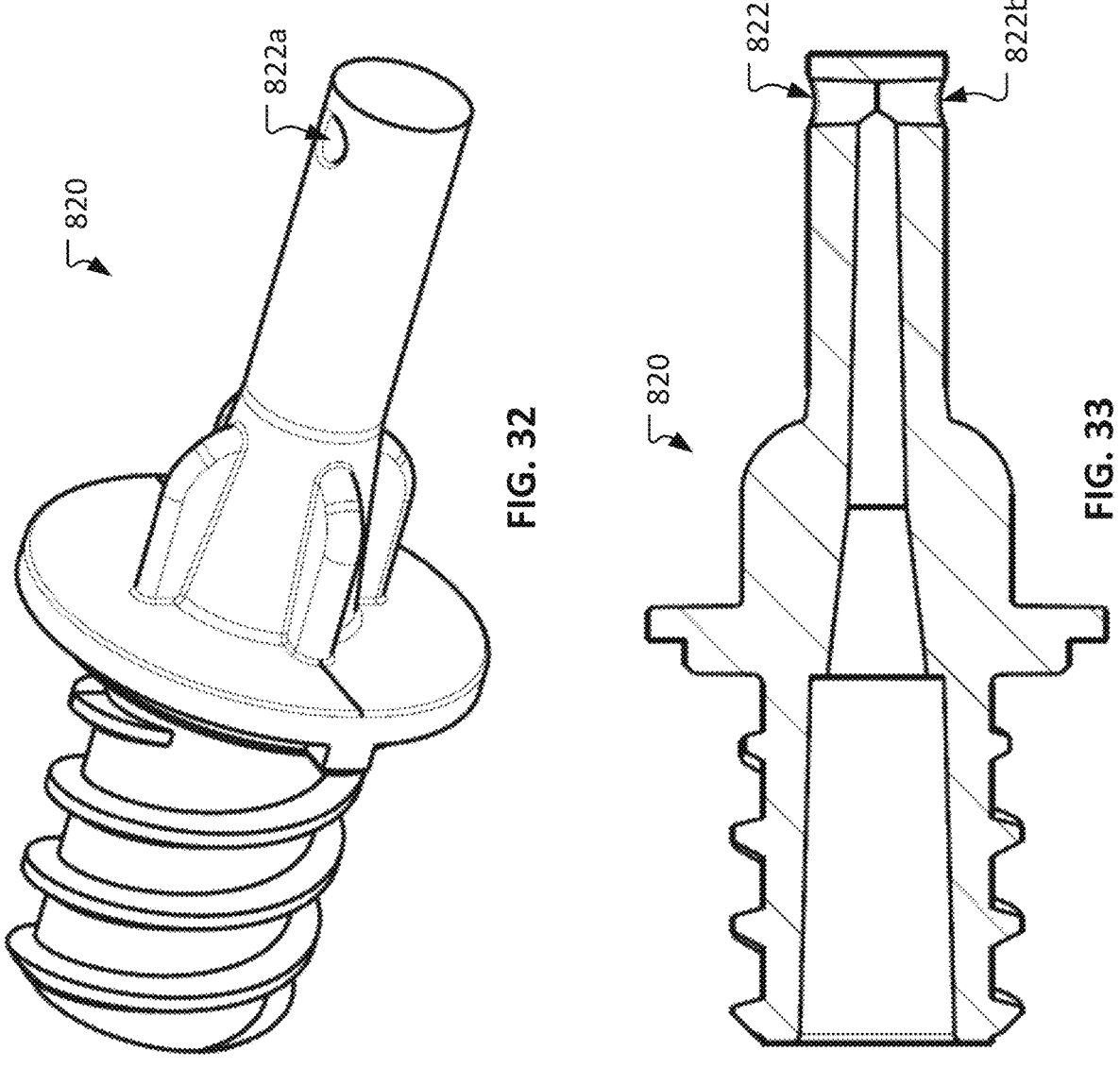

FIG. 32 is a perspective view of an example female valve stem used with the female coupling of the fluid coupling system of FIG. 19.

FIG. 33 is a longitudinal cross-sectional side view of the female valve stem of FIG. 32.

Figure 34:
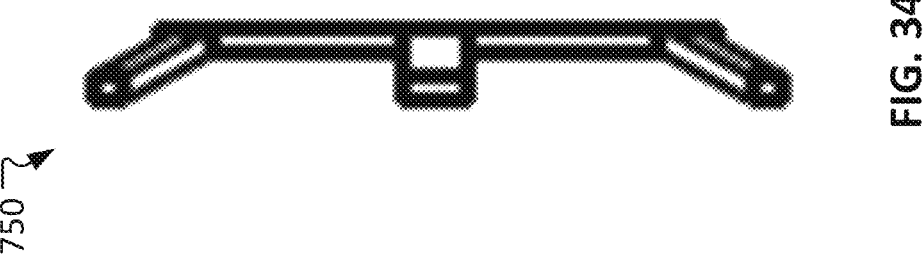

FIG. 34 is a side view of an example spring retainer used with the male coupling of the fluid coupling system of FIG. 19.

Figure 35:
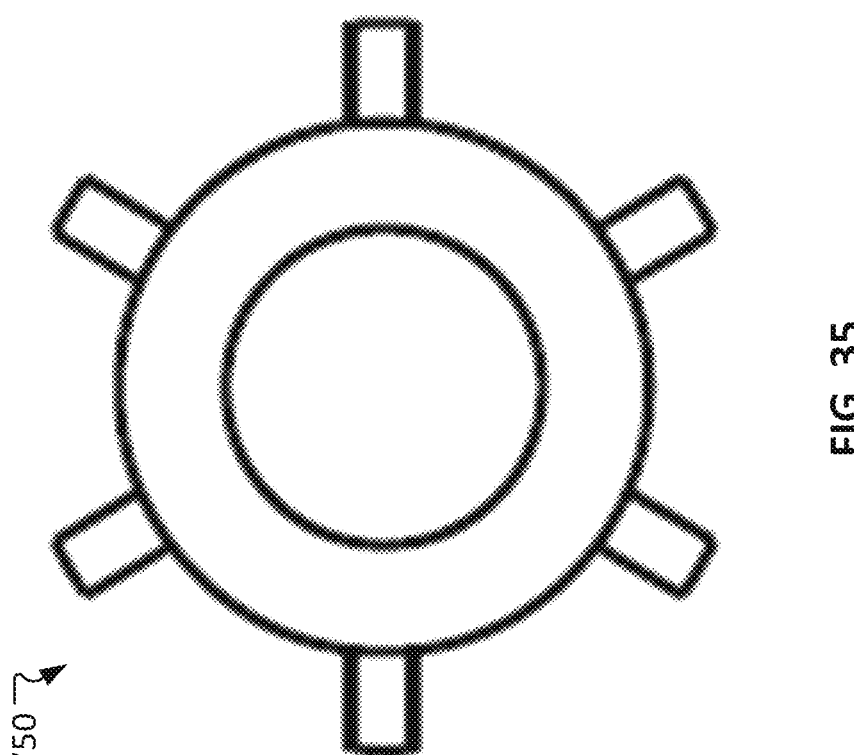

FIG. 35 is an end view of the spring retainer of FIG. 34.

Like reference numbers represent corresponding parts throughout.

DETAILED DESCRIPTION OF ILLUSTRATIVE EMBODIMENTS

This document describes fluid coupling devices for fluid systems and methods. For example, in some embodiments this document describes fluid couplings that can be used to provide a sterile connection for drug delivery. In some embodiments, the fluid coupling devices can be implemented as multi-use, sterile fluid coupling devices that are configured to reduce the likelihood of fluid spillage when being disconnected.

The couplings and coupling systems described herein solve, for example, some issues related to repeatably providing a sterile connection for drug delivery. The couplings and coupling systems described herein achieve this by use of a wiping seal and a minimum number of components.

Referring to FIGS. 1 and 2, an example fluid coupling system 300 includes an insert coupling 100 and a body coupling 200. The insert coupling 100 can also be referred to as a male coupling 100, and the body coupling 200 can also be referred to as a female coupling 200. The insert coupling 100 and the body coupling 200 are configured to be mated/coupled together in a releasably latched arrangement to create the fluid coupling system 300 (as shown in FIG. 2) in which an open fluid flow path is created through both of the insert coupling 100 and the body coupling 200, as described further below. The open fluid flow path is created by the action of mating insert coupling 100 and the body coupling 200, as described further below. When the insert coupling 100 and the body coupling 200 are uncoupled from each other (as shown in FIG. 1), internal valves in the insert coupling 100 and the body coupling 200 close and seal off the fluid flow path in each of the insert coupling 100 and the body coupling 200.

In some cases, the open fluid flow path through the fluid coupling system 300 can be a sterile flow path used for delivering drugs from a syringe to an IV system that is connected to a patient. That is, in some cases a syringe can be coupled to the body coupling 200 and the insert coupling 100 can be coupled to an IV system. Accordingly, a drug from the syringe can thereby be delivered into the IV system via the fluid coupling system 300.

The materials from which one or more of the components of the fluid coupling system 300 are made of include thermoplastics. In particular embodiments, the materials from which the components of the fluid coupling system 300 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the fluid coupling system 300 are made of include metals such as, but not limited to stainless steel, brass, aluminum, plated steel, zinc, and the like. In particular embodiments, the fluid coupling system 300 is metallic-free.

In some embodiments, the springs of the fluid coupling system 300 are made of a metallic material (e.g., spring steel, stainless steel such as 316L, piano/music wire, beryllium copper, titanium, and the like). In some embodiments, the spring 140 can be made of a polymeric, thermoset, or elastomeric material (e.g., PEEK, PPSU, PSU, etc.) and could include fillers (glass fiber, carbon fiber, etc.).

In certain embodiments, seal members of the fluid coupling system 300 can be made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shapes of the seals can be circular, D-shaped, X-shaped, square, rectangular, U-shaped, multi-lobed, L-shaped, V-shaped, hourglass shaped, and the like, without limitation.

Referring to FIGS. 3 and 4, the insert coupling 100 includes an insert housing 110, an insert valve member 120, an insert seal member 130, and an insert spring 140. The insert seal member 130 is affixed to the front face of the insert housing 110. Accordingly, the insert seal member 130 comprises the front face of the insert coupling 100.

In some embodiments, the insert seal member 130 is overmolded onto the insert housing 110. In some embodiments, the insert seal member 130 is attached to the insert housing 110 in another manner, such as by using an adhesive, ultrasonic welding, press-fitting, and the like.

The end of the insert housing 110 that is opposite of the front face where the insert seal member 130 is affixed can be a fluid connection or termination that is configured to be connected to another component. Such a fluid connection or termination can be configured in any desired manner (e.g., as a luer fitting, a barbed connection, a threaded connection, as any type of adapter, a sanitary fitting, etc., without limitation).

The insert valve member 120 is slidably disposed within an internal space defined by the insert housing 110. That is, the insert valve member 120 can slide along the longitudinal axis of the insert housing 110. As shown, the insert valve member 120 includes a projection 122 that engages and seals within a bore defined by the insert seal member 130. When the projection 122 is engaged within the bore defined by the insert seal member 130 no fluid can flow through the insert coupling 100.

The insert spring 140 is disposed within the internal space defined by the insert housing 110. The insert spring 140 is compressed between the insert housing 110 and the insert valve member 120. The insert spring 140 biases the insert valve member 120 to be abutted against the insert seal member 130. Accordingly, the insert spring 140 biases the projection 122 of the insert valve member 120 to be engaged within the bore defined by the insert seal member 130 so that no fluid can flow through the insert coupling 100.

The insert housing 110 defines a circumferential groove 112 that is configured to receive latch members of the body coupling 200.

Referring to FIGS. 5 and 6, the body coupling 200 includes a body housing 210, a cover 218, a stem and termination member 220, a body seal member 230, and a body spring 240. The cover 218 is affixed to the body housing 210. The cover 218 defines an internal space in which the termination portion of the stem and termination member 220 is disposed.

The termination portion of the stem and termination member 220 can be a fluid connection or termination that is configured to be connected to another component. Such a fluid connection or termination can be configured in any desired manner (e.g., as a luer fitting, a barbed connection, a threaded connection, as any type of adapter, a sanitary fitting, etc., without limitation).

In some embodiments, the stem and termination member 220 can be coupled to the body housing 210 using a one-way rotating connection. That is, in some embodiments the stem and termination member 220 is rotatable relative to the body housing 210 in one direction, but not rotatable relative to the body housing 210 in the opposite direction. Such an arrangement can serve to allow a component (e.g., a syringe with a luer fitting) to be threadedly coupled to the termination portion of the stem and termination member 220, but then not allowed to be removed therefrom.

Referring also to FIGS. 11 and 12, here the stem and termination member 220 is shown in isolation. It can be seen that the end portion of the stem portion of the stem and termination member 220 defines a lateral opening 222. This lateral opening 222 is an opening to a lumen defined by the stem and termination member 220. While the depicted embodiment includes a single lateral opening 222, in some embodiments two or more lateral openings are included in the stem and termination member 220.

Still referring to FIGS. 5 and 6, the body seal member 230 is slidably disposed within an internal space defined by the body housing 210. That is, the body seal member 230 can slide along the longitudinal axis of the body housing 210. As shown, the body seal member 230 abuts against a hard stop of the body housing 210 at one end of its travel. The body seal member 230 defines a bore that receives and seals with the stem portion of the stem and termination member 220. When the body seal member 230 is engaged with the end portion of the stem and termination member 220 (as shown), the body seal member 230 covers and seals the lateral opening 222 of the stem and termination member 220 so that no fluid can flow through the body coupling 200. The body seal member 230 is slidable along the stem portion of the stem and termination member 220, as described further below. In some embodiments, the body seal 230 can include one or more circumferential ribs on the inside and/or outside diameter to provide defined sealing locations while minimizing friction with the body and stem.

The body spring 240 is disposed within the internal space defined by the body housing 210. The body spring 240 is compressed between the stem and termination member 220 and body seal member 230. Accordingly, the body spring 240 biases the body seal member 230 to be engaged with the end portion of the stem and termination member 220 (as shown) so that no fluid can flow through the body coupling 200.

In the depicted embodiment, the body housing 210 includes a pair of latch members 214. In some embodiments, other types of latching mechanisms can be used. The latch members 214 include a first end that includes at least one projection 215 and an opposite, second end that includes a depressible arm 217. When the depressible arm 217 is manually depressed by a user of the body coupling 200, the latch member 214 will pivot or twist. As the latch member 214 pivots, the first end that includes the at least one projection 215 will pivot in an upward direction away from the central longitudinal axis of the body housing 210 (in a direction opposite of the depressible arm 217 as it is depressed).

When the force from the manual depression of the depressible arm 217 is removed, the latch members 214 will rebound (naturally un-pivot or un-twist) to return the latch members 214 to the depicted arrangement. In some embodiments, the body housing 210 (including the latch members 214) is a monolithic, unitary component (e.g., injection molded). In some embodiments, the body housing 210 can be constructed from separate but coupled components rather than being monolithic. That is, in some embodiments the latch members 214 can be separate components from the body housing 210.

FIGS. 7-10 are a sequence of views that depict a process of coupling the insert coupling 100 and the body coupling 200 together to create the fluid coupling system 300 that has an open fluid flow path therethrough. In order to keep these figures uncluttered and clearer for the viewer, some reference numbers are not shown. The viewer should refer to FIGS. 3-6 for such reference numbers.

In FIG. 7, the insert coupling 100 has been partially inserted into the body coupling 200. In this arrangement, the front face of the insert seal member 130 is abutted against the front face of the body seal member 230. However, neither the insert seal member 130 nor the body seal member 230 have yet moved from their end of travel positions that seal-off fluid from flowing through the insert coupling 100 and the body coupling 200, respectively.

In this view, it can be seen that the projection 122 of the insert valve member 120 is aligned with the stem portion of the stem and termination member 220. Both the projection 122 and the stem portion of the stem and termination member 220 are centered on the central axes of the insert coupling 100 and the body coupling 200, respectively. The springs 140 and 240 have not been compressed in this arrangement (other than the pre-load on the springs 140 and 240 that exists when the insert coupling 100 and the body coupling 200 are uncoupled from each other).

FIG. 8 shows that the insert coupling 100 has been inserted into the body coupling 200 a little farther than the arrangement of FIG. 7. Now it can be seen that the insert seal member 130 has pushed the body seal member 230 a little ways into the internal space of the body housing 210 such that the body seal member has been slid along the stem portion of the stem and termination member 220 away from its end of travel position. It can also be seen that the leading end of the stem portion of the stem and termination member 220 has pushed the insert valve member 120 a little ways into the internal space of the insert housing 110. Both springs 140 and 240 have become a little more compressed in this arrangement.

In the arrangement of FIG. 8, still no fluid can flow through the insert coupling 100 and/or the body coupling 200. That is the case because the end portion of the stem portion of the stem and termination member 220 is within the bore of the insert seal member 130, and the lateral opening 222 is thereby covered and sealed by the insert seal member 130.

In FIGS. 9 and 10, the insert coupling 100 and the body coupling 200 are fully coupled together in a releasably latched arrangement that creates the fluid coupling system 300 in which an open fluid flow path is created through both of the insert coupling 100 and the body coupling 200. When the insert coupling 100 and the body coupling 200 are fully coupled together, the projections 215 of the latch members 214 will automatically snap into the circumferential groove 112. The projections 215 of the latch members 214 are then engaged within the circumferential groove 112 of the insert coupling 100 to releasably latch the insert coupling 100 and the body coupling 200 together.

In the fully coupled arrangement as shown, the lateral opening 222 is open to the internal space defined by the insert housing 110. The open fluid flow path of the fluid coupling system 300 extends through the lateral opening 222 and through one or more openings defined by the insert valve member 120.

To uncouple the insert coupling 100 and the body coupling 200, the user can simply simultaneously or individually depress the depressible arms 217 to disengage the projections 215 of the latch members 214 from the circumferential groove 112 of the insert coupling 100. The springs 140 and 240 will naturally assist with the uncoupling (i.e., the separation between the insert coupling 100 and the body coupling 200). The uncoupling process is the reverse of the coupling process.

As the insert coupling 100 and the body coupling 200 are coupled together (i.e., transitioned from the arrangement of FIG. 7 to the arrangement of FIG. 9), the seal members 130 and 230 wipe across the stem portion of the stem and termination member 220. These wiping actions are advantageous for multiple reasons. First, when the insert coupling 100 and the body coupling 200 are coupled together no surfaces that are exposed to the ambient ever contact areas that are wetted by a fluid contained in either of the insert coupling 100 or the body coupling 200. Accordingly, a sterile connection can be made (although in some cases portions of the insert coupling 100 and/or the body coupling 200 may need sterile cleaning/wiping prior to coupling together). The same holds true when the insert coupling 100 and the body coupling 200 are uncoupled from each other, i.e., no surfaces that are exposed to the ambient ever contact areas that are wetted by a fluid. Accordingly, a sterile disconnection can be made. Moreover, no wetted surfaces are ever exposed to ambient. For these reasons, the insert coupling 100 and the body coupling 200 can be used in a sterile manner over the course of multiple cycles of connection and disconnection.

Moreover, because the seal members 130 and 230 abut against each other, and because of the wiping actions that take place during coupling and uncoupling of the insert coupling 100 and the body coupling 200, fluid spillage is advantageously prevented during uncoupling and air inclusion is prevented when coupling.

Referring to FIGS. 13 and 14, another example fluid coupling system 600 includes an insert coupling 400 and a body coupling 500. The insert coupling 400 can also be referred to as a male coupling 400, and the body coupling 500 can also be referred to as a female coupling 500. The insert coupling 400 and the body coupling 500 are configured to be mated/coupled together in a releasably latched arrangement to create the fluid coupling system 600 (as shown in FIG. 14) in which an open fluid flow path is created through both of the insert coupling 400 and the body coupling 500, as described further below. The open fluid flow path is created by the action of mating insert coupling 400 and the body coupling 500, as described further below. When the insert coupling 400 and the body coupling 500 are uncoupled from each other (as shown in FIG. 13), internal valves in the insert coupling 400 and the body coupling 500 close and seal off the fluid flow path in each of the insert coupling 400 and the body coupling 500.

In some cases, the open fluid flow path through the fluid coupling system 600 can be a sterile flow path used for delivering drugs from a syringe to an IV system that is connected to a patient. That is, in some cases a syringe can be coupled to the body coupling 500 and the insert coupling 400 can be coupled to an IV system. Accordingly, a drug from the syringe can thereby be delivered into the IV system via the fluid coupling system 600.

The materials from which one or more of the components of the fluid coupling system 600 are made of include thermoplastics. In particular embodiments, the materials from which the components of the fluid coupling system 600 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the fluid coupling system 600 are made of include metals such as, but not limited to stainless steel, brass, aluminum, plated steel, zinc, and the like. In particular embodiments, the fluid coupling system 600 is metallic-free.

In some embodiments, the springs of the fluid coupling system 600 are made of a metallic material (e.g., spring steel, stainless steel such as 316L, piano/music wire, beryllium copper, titanium, and the like). In some embodiments, the spring 140 can be made of a polymeric, thermoset, or elastomeric material (e.g., PEEK, PPSU, PSU, etc.) and could include fillers (glass fiber, carbon fiber, etc.).

In certain embodiments, seal members of the fluid coupling system 600 can be made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shapes of the seals can be circular, D-shaped, X-shaped, square, rectangular, U-shaped, multi-lobed, L-shaped, V-shaped, hourglass shaped, and the like, without limitation.

FIG. 15 shows a longitudinal cross-sectional view of the insert coupling 400 in isolation. The components of the insert coupling 400 include an insert connection member 402, a first insert housing portion 410, a second insert housing portion 416, an insert stem 420, an insert seal member 430, a gasket 436, and an insert spring 440.

In some embodiments, the insert connection member 402 is a nut for a luer fitting connection. Accordingly, in some embodiments the insert connection member 402 is rotatably coupled to the first insert housing portion 410. It should be understood that the end of the insert coupling 400 where the insert connection member 402 is located is a fluid connection or termination that is configured to be connected to another component. Such a fluid connection or termination can be configured in any desired manner (e.g., as a luer fitting, a barbed connection, a threaded connection, as any type of adapter, a sanitary fitting, etc., without limitation).

The insert stem 420 is slidably disposed within internal spaced defined by the insert housing portions 410 and 416. The insert spring 440 biases the insert stem 420 to the position shown. The insert stem 420 carries the gasket 436 in a groove defined by the insert stem 420. The gasket 436 seals against the inner diameter of the second insert housing portion 416.

The insert stem 420 defines a central lumen. The insert stem 420 defines also defines a lateral opening at an end portion of the insert stem 420 that is near to the insert seal member 430. The lateral opening is in fluid communication with the central lumen. The end of the insert stem 420 is flush with the end of the insert seal member 430 at the leading end (face) of the insert coupling 400.

The insert seal member 430 is attached to the second insert housing portion 416 at the leading end (face) of the insert coupling 400. The insert seal member 430 defines a central opening in which the end portion of the insert stem 420 is slidably received.

Referring to FIG. 16, the body coupling 500 includes a cover 510, a first body housing portion 512, a second body housing portion 516 (with a pair of latch members 514), a body stem 520 (which defines a central lumen and a lateral opening), a body termination member 502, a body seal member 530, and a body spring 540. In some embodiments, the cover 510 is affixed to the second body housing portion 516. The cover 510 defines an internal space in which the body termination member 502 is disposed.

The body termination member 502 can be a fluid connection or termination that is configured to be connected to another component. Such a fluid connection or termination can be configured in any desired manner (e.g., as a luer fitting, a barbed connection, a threaded connection, as any type of adapter, a sanitary fitting, etc., without limitation).

The body seal member 530 is slidably disposed within an internal space defined by the first body housing portion 512. That is, the body seal member 530 can slide along the longitudinal axis of the first body housing portion 512. As shown, the body seal member 530 (which can include a seal carrier) abuts against a hard stop of the first body housing portion 512 at one end of its travel. The body seal member 530 defines a bore that receives and seals with the body stem 520. In some embodiments, body seal member 530 includes one or more circumferential ribs on the inside and/or outside to provide optimal sealing and reduced friction. When the body seal member 530 is engaged with the end portion of the body stem 520 (as shown), the body seal member 530 covers and seals a lateral opening of the body stem 520 so that no fluid can flow through the body coupling 500. The body seal member 530 is slidable along the body stem 520, as described further below.

The body spring 540 is disposed within the internal space defined by the first body housing portion 512. The body spring 540 is compressed between the body termination member 502 and body seal member 530. Accordingly, the body spring 540 biases the body seal member 530 to position shown, where the body seal member 530 is engaged with the end portion of the body stem 520 (as shown) so that no fluid can flow through the body coupling 500.

The second body housing portion 516 includes a pair of latch members 514. The latch members 514 include a first end that includes at least one projection 515 and an opposite, second end that includes a depressible arm 517. When the depressible arm 517 is manually depressed by a user of the body coupling 500, the latch member 514 will pivot. As the latch member 514 pivots, the first end that includes the at least one projection 515 will pivot or twist in an upward direction away from the central longitudinal axis of the body coupling 500 (in a direction opposite of the depressible arm 517 as it is depressed).

When the force from the manual depression of the depressible arm 517 is removed, the latch members 514 will rebound (naturally un-pivot or un-twist) to return the latch members 514 to the depicted arrangement. In some embodiments, the second body housing portion 516 (including the latch members 514) is a monolithic, unitary component (e.g., injection molded). In some embodiments, the second body housing portion 516 can be constructed from separate but coupled components rather than being monolithic. That is, in some embodiments the latch members 514 can be separate components from the second body housing portion 516.

FIGS. 17 and 18, depict a sequence of coupling the insert coupling 400 and the body coupling 500 together to create the fluid coupling system 600 that has an open fluid flow path therethrough. In order to keep these figures uncluttered and clearer for the viewer, some reference numbers are not shown. The viewer should refer to FIGS. 15 and 16 for such reference numbers.

In FIG. 17, the insert coupling 400 has been partially inserted into the body coupling 500. In this arrangement, the front face of the insert seal member 430 is abutted against the front face of the body seal member 530. However, neither the insert seal member 530 nor the body seal member 530 have yet moved from their end of travel positions that seal-off fluid from flowing through the insert coupling 400 and the body coupling 500, respectively.

In this view, it can be seen that the lateral opening of the insert stem 420 is sealed by the insert seal member 430, and the lateral opening of the body stem 520 is sealed by the body seal member 530. The springs 440 and 540 have not been compressed in this arrangement (other than the pre-load on the springs 440 and 540 that exists when the insert coupling 400 and the body coupling 500 are uncoupled from each other). It can also be seen that the inner and outer diameters of the insert seal member 430 and the body seal member 530 are essentially equal to each other.

In FIG. 18, the insert coupling 400 and the body coupling 500 are fully coupled together in a releasably latched arrangement that creates the fluid coupling system 600 in which an open fluid flow path is created through both of the insert coupling 400 and the body coupling 500. When the insert coupling 400 and the body coupling 500 are fully coupled together, the projections 515 of the latch members 514 will automatically snap into a circumferential groove defined by the insert coupling 400. The projections 515 of the latch members 514 are then engaged within the circumferential groove of the insert coupling 400 to releasably latch the insert coupling 400 and the body coupling 500 together.

In the fully coupled arrangement as shown, the body stem 520 is extending through the openings defined by each of the seals 430 and 530. The lateral opening of the body stem 520 is open to the internal space defined by the second insert housing portion 416. In addition, the lateral opening of the insert stem 420 is also open to the internal space defined by the second insert housing portion 416. Accordingly, the lateral openings of the insert stem 420 and the body stem 520 are in fluid communication with each other. The open fluid flow path of the fluid coupling system 600 extends through the lumens and lateral openings of the insert stem 420 and the body stem 520.

To uncouple the insert coupling 400 and the body coupling 500, the user can simply simultaneously depress the depressible arms 517 to disengage the projections 515 of the latch members 514 from the circumferential groove of the insert coupling 400. The springs 440 and 540 will naturally assist with the uncoupling (i.e., the separation between the insert coupling 400 and the body coupling 500). The uncoupling process is the reverse of the coupling process.

As the insert coupling 400 and the body coupling 500 are coupled together (i.e., transitioned from the arrangement of FIG. 17 to the arrangement of FIG. 18), the seal members 430 and 530 wipe across the stems 420 and 520. These wiping actions are advantageous for multiple reasons. First, when the insert coupling 400 and the body coupling 500 are coupled together no surfaces that are exposed to the ambient ever contact areas that are wetted by a fluid contained in either of the insert coupling 400 or the body coupling 500. Accordingly, a sterile connection can be made. The same holds true when the insert coupling 400 and the body coupling 500 are uncoupled from each other, i.e., no surfaces that are exposed to the ambient ever contact areas that are wetted by a fluid. Accordingly, a sterile disconnection can be made. Moreover, no wetted surfaces are ever exposed to ambient. For these reasons, the insert coupling 400 and the body coupling 500 can, under some circumstances, be used in a sterile manner over the course of multiple cycles of connection and disconnection. In some cases, sterile wiping of the portions of the insert coupling 400 and/or the body coupling 500 may help facilitate use of the fluid couplings in a sterile manner over the course of multiple cycles of connection and disconnection.

Moreover, because the seal members 430 and 530 abut against each other, and because of the wiping actions that take place during coupling and uncoupling of the insert coupling 400 and the body coupling 500, fluid spillage is advantageously prevented during uncoupling and air inclusion is prevented when coupling.

Referring to FIGS. 19 and 20, an example fluid coupling system 900 includes an insert coupling 700 and a body coupling 800. The insert coupling 700 can also be referred to as a male coupling 700, and the body coupling 800 can also be referred to as a female coupling 800. The insert coupling 700 and the body coupling 800 are configured to be mated/coupled together in a releasably latched arrangement to create the fluid coupling system 900 (as shown in FIG. 20) in which an open fluid flow path is created through both of the insert coupling 700 and the body coupling 800, as described further below. The open fluid flow path is created by the action of mating insert coupling 700 and the body coupling 800, as described further below. When the insert coupling 700 and the body coupling 800 are uncoupled from each other (as shown in FIG. 1), internal valves in the insert coupling 700 and the body coupling 800 close and seal off the fluid flow path in each of the insert coupling 700 and the body coupling 800.

In some cases, the open fluid flow path through the fluid coupling system 900 can be a sterile flow path used for delivering drugs from a syringe to an IV system that is connected to a patient. That is, in some cases a syringe can be coupled to the body coupling 800 and the insert coupling 700 can be coupled to an IV system (or vice versa). Accordingly, a drug from the syringe can thereby be delivered into the IV system via the fluid coupling system 900.

The fluid coupling system 900 shares many functional characteristics of the fluid coupling systems 300 and 600 described above. For example, as described further below, the fluid coupling system 900 is designed/configured so that a sterile connection can be made between the insert coupling 700 and the body coupling 800. The same holds true when the insert coupling 700 and the body coupling 800 are uncoupled from each other, i.e., no surfaces that are exposed to the ambient ever contact areas that are wetted by a fluid. Accordingly, a sterile disconnection can be made. Moreover, no wetted surfaces are ever exposed to ambient. For these reasons, the insert coupling 700 and the body coupling 800 can, under some circumstances, be used in a sterile manner over the course of multiple cycles of connection and disconnection. In some cases, sterile wiping of the portions of the insert coupling 700 and/or the body coupling 800 may help facilitate use of the fluid couplings in a sterile manner over the course of multiple cycles of connection and disconnection.

One difference between the fluid coupling system 900 and the fluid coupling systems 300 and 600 described above is the latching mechanism that is used to releasably couple the insert coupling 700 to the body coupling 800. In the case of the fluid coupling system 900, a single depressible thumb latch 814 (FIGS. 27-29) is included (in contrast to the fluid coupling systems 300 and 600 that use a pair of latch members 214/514).

The materials from which one or more of the components of the fluid coupling system 900 are made of include thermoplastics. In particular embodiments, the materials from which the components of the fluid coupling system 900 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the fluid coupling system 900 are made of include metals such as, but not limited to stainless steel, brass, aluminum, plated steel, zinc, and the like. In particular embodiments, the fluid coupling system 900 is metallic-free.

In some embodiments, the springs of the fluid coupling system 900 are made of a metallic material (e.g., spring steel, stainless steel such as 316L, piano/music wire, beryllium copper, titanium, and the like). In some embodiments, the spring 140 can be made of a polymeric, thermoset, or elastomeric material (e.g., PEEK, PPSU, PSU, etc.) and could include fillers (glass fiber, carbon fiber, etc.).

In certain embodiments, the seal members and sealing portions included in the fluid coupling system 900 can be made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shapes of the seals can be circular, D-shaped, X-shaped, square, rectangular, U-shaped, multi-lobed, L-shaped, V-shaped, hourglass shaped, and the like, without limitation.

Referring to FIGS. 21 and 22, the insert coupling 700 includes an insert termination 704, an insert housing 710, an insert valve member 720, an insert seal member 730, and an insert spring 740. The insert seal member 730 is affixed to the front face of the insert housing 710. Accordingly, the insert seal member 730 comprises the front face of the insert coupling 700.

In some embodiments, the insert seal member 730 is overmolded onto the insert housing 710. In some embodiments, the insert seal member 730 is attached to the insert housing 110 in another manner, such as by using an adhesive, ultrasonic welding, press-fitting, and the like.

The termination 704 is extends from an end of the housing 710 that is opposite of the front face where the insert seal member 730 is affixed. The termination 704 can be a fluid connection or termination that is configured to be connected to another component. Such a fluid connection or termination 704 can be configured in any desired manner (e.g., as a luer fitting (as shown), a barbed connection, a threaded connection, as any type of adapter, a sanitary fitting, etc., without limitation). In some embodiments, the insert coupling 700 does not include the termination 704.

In the depicted embodiment, the insert termination 704 is designed to snap into engagement with the housing 710. The cross-sectional view of FIG. 22 makes visible the example mechanical features of the snap-into-engagement joining mechanisms between the insert termination 704 and the housing 710. That is, the housing 710 can include one or more teeth projecting radially outward, and the termination 704 can include one or more corresponding grooves in which the one or more teeth can latch within. As shown, a seal 706 can be positioned between the termination 704 and the housing 710 to provide a fluid-tight seal between them.

Also referring to FIGS. 25 and 26, the insert valve member 720 is slidably disposed within an internal space defined by the insert housing 710. That is, the insert valve member 720 can slide along the longitudinal axis 901 of the insert housing 710. As shown, the insert valve member 720 includes a projection 722 that engages and seals within a bore defined by the insert seal member 730. When the projection 722 is engaged within the bore defined by the insert seal member 730 no fluid can flow through the insert coupling 700. The projection 722 has a front face 723. When the projection 722 is fully engaged within the bore defined by the insert seal member 730, the front face 723 of the insert valve member 720 is flush (planar) with a forward-facing surface 731 of the insert seal member 730.

The insert valve member 720 also includes one or more lobes 724. In the non-limiting depicted example, the insert valve member 720 includes three lobes 724a, 724b, and 724c. In some embodiments, two lobes 724, four lobes 724, or more than four lobes 724 are included. The lobes 724a-c project radially outward from the central axis of the insert valve member 720. In the depicted example, the centers of the lobes 724a-c are each equally spaced 120° apart from each other around the central axis of the insert valve member 720, but such a relative arrangement is not always required. The lobes 724a-c provide the surfaces of the insert valve member 720 that the spring 740 abuts against to bias the insert valve member 720 to the position shown in FIG. 22 in which the insert valve member 720 is fluidly sealed within the insert seal member 730. The lobes 724a-c also provide the surfaces of the insert valve member 720 that abut against the insert seal member 730 to limit the travel of the insert valve member 720 (to the position shown in FIG. 22). The outermost edges of the lobes 724a-c loosely run against the inner wall of the interior space defined by the housing 710, thereby keeping the insert valve member 720 centered within the housing 710.

The insert spring 740 is disposed within the internal space defined by the insert housing 710. The insert spring 140 is compressed between the lobes 724a-c of the insert valve member 720 and an example spring retainer 750 (also refer to FIGS. 34 and 35). The spring retainer 750 can be pressed (one-way only) into the inner space of the housing 710. When the spring retainer 750 is in position within the housing 710 it will not back out, because the spring retainer 750 includes multiple radially extending fingers that are canted to allow the spring retainer 750 to be pressed in, but not back out.

The insert spring 740 biases the insert valve member 720 to be abutted against the insert seal member 730. Accordingly, the insert spring 740 biases the projection 722 of the insert valve member 720 to be engaged within the bore defined by the insert seal member 730 so that no fluid can flow through the insert coupling 700.

The exterior of the insert housing 710 defines a circumferential groove 712 that is configured to receive a portion of the thumb latch 814 of the body coupling 800.

Still referring to FIGS. 21 and 22, the body coupling 800 includes a body housing 810, the thumb latch 814, a valve stem and termination member 820, a body seal member 830, a body spring 840, and a termination retainer 850.

The termination portion of the valve stem and termination member 820 can be a fluid connection or termination that is configured to be connected to another component. Such a fluid connection or termination can be configured in any desired manner (e.g., as a luer fitting, a barbed connection, a threaded connection, as any type of adapter, a sanitary fitting, etc., without limitation).

The termination retainer 850 is a cylindrical member that snaps onto the housing 810 to detain the valve stem and termination member 820 in engagement with the housing 810. Because the termination retainer 850 snaps into engagement with the housing 810 to retain the valve stem and termination member 820, an efficient assembly process that allows for various types of valve stem and termination members 820 to be conveniently engaged with the housing 810 is advantageously facilitated.

In some embodiments, the valve stem and termination member 820 can be coupled to the body housing 810 using a one-way rotating connection. That is, in some embodiments the valve stem and termination member 820 is rotatable relative to the body housing 810 in one direction, but not rotatable relative to the body housing 810 in the opposite direction. Such an arrangement can serve to allow a component (e.g., a syringe with a luer fitting) to be threadedly coupled to the termination portion of the valve stem and termination member 820, but then not allowed to be removed therefrom.

Referring also to FIGS. 32 and 33, here the valve stem and termination member 820 is shown in isolation. It can be seen that the end portion of the stem portion of the valve stem and termination member 820 defines two lateral openings 822a and 822b. These lateral openings 822a-b are an openings to a lumen defined by the valve stem and termination member 820. While the depicted embodiment includes two lateral opening 822a-b, in some embodiments one, three, four or more lateral openings are included in the valve stem and termination member 820.

Still referring to FIGS. 21 and 22, and also referring to FIGS. 30 and 31, the body seal member 830 is slidably disposed within an internal space defined by the body housing 810. That is, the body seal member 830 can slide along the longitudinal axis 901 of the body housing 810. As shown, the body seal member 830 abuts against a hard stop of the body housing 810 at one end of its travel. The body seal member 830 defines a bore 832 that receives and seals with the stem portion of the valve stem and termination member 820. When the body seal member 830 is engaged with the end portion of the valve stem and termination member 820 (as shown in FIG. 22), the body seal member 830 covers and seals the lateral openings 822a-b of the valve stem and termination member 820 so that no fluid can flow through the body coupling 800. The body seal member 830 is slidable along the stem portion of the valve stem and termination member 820, as described further below. When the body seal member 830 is in the fully closed position (as shown in FIG. 22), the forward-facing surface of the body seal member 830 and the front face of the valve stem and termination member 820 are planar with each other. In some embodiments, the body seal 830 can include one or more circumferential ribs on its inside and/or outside diameter to provide defined sealing locations while minimizing friction with the body housing 810 and/or valve stem and termination member 820.

The body spring 840 is disposed within the internal space defined by the body housing 810. The body spring 840 is compressed between the valve stem and termination member 820 and body seal member 830. Accordingly, the body spring 840 biases the body seal member 830 to be engaged with the end portion of the valve stem and termination member 820 (as shown) so that no fluid can flow through the body coupling 800.

Referring also to FIGS. 27-29, in the depicted embodiment the body coupling 800 also includes the thumb latch member 814. The thumb latch member 814 includes a depressible surface 815, a groove engagement member 816 that defines an opening 817 and includes a groove engagement portion 818, and a cantilever spring 819.

The groove engagement member 816 is arranged orthogonally in relation to the depressible surface 815. The groove engagement member 816 extends transverse or perpendicular to the axis 901. The groove engagement member 816 defines the opening 817 through which the axis 901 extends. The opening 817 is ovular and configured to receive a front-end portion of the male coupling 700. As described further below, as the front-end portion of the male coupling 700 is inserted through the opening 817, the groove engagement portion 818 will be forced away from the axis 901. As the male coupling 700 is inserted farther, the groove engagement portion 818 will snap back toward the axis 901 and into engagement with the circumferential groove 712 of the male coupling 700.

The thumb latch member 814 includes the cantilever spring 819. As shown in FIG. 22, the free end portion of the cantilever spring 819 abuts against the body housing 810. Accordingly, the cantilever spring 819 biases the thumb latch member 814 into the latched position (as shown in FIGS. 22 and 24) in which the groove engagement portion 818 is in position to be in engagement with the circumferential groove 712 of the male coupling 700. The cantilever spring 819 resiliently flexes when the depressible surface 815 is pushed/forced toward the axis 901 (e.g., in order to unlatch the insert coupling 700 from the body coupling 800). Then, when the force on the depressible surface 815 is released, the cantilever spring 819 rebounds to move the thumb latch member 814 back to the latched position. In some embodiments, a coil spring can be used instead of the cantilever spring 819.

Referring also to FIGS. 23 and 24, the insert coupling 700 and the body coupling 800 can be releasably coupled to create the fluid coupling system 900. In FIG. 23, the insert coupling 700 and the body coupling 800 are abutted against each other but are not coupled, and the fluid flow paths through the insert coupling 700 and the body coupling 800 are each individually closed. In contrast, in FIG. 24 the insert coupling 700 and the body coupling 800 are fully coupled and an open fluid flow path is defined through the insert coupling 700 and the body coupling 800.

As shown in FIG. 23, in preparation for coupling of the insert coupling 700 and the body coupling 800, the front faces of the insert valve member 720 and the valve stem and termination member 820 are pressed against each other. The front faces of the insert valve member 720 and the valve stem and termination member 820 are equal in diameter. Accordingly, the front faces of the insert valve member 720 and the valve stem and termination member 820 (which may be bio-contaminated as a result of potentially being previously exposed exterior surfaces) do not make contact with or contaminate the fluid that will flow through the fluid coupling system 900. The same is true of the contacting surface portions of the front face surfaces of the insert seal member 730 and body seal member 830. That is, while those surfaces may be bio-contaminated as a result of potentially being previously exposed exterior surfaces, those surfaces will not become in contact with or contaminate any fluid that will flow through the fluid coupling system 900. The contact interface between the front face surfaces of the insert seal member 730 and body seal member 830 can also provide a fluid-tight seal between them.

FIG. 24 shows the insert coupling 700 and the body coupling 800 in a fully releasably coupled configuration that creates the fully operational fluid coupling system 900 which defines an open fluid flow path there through. To arrive at this fully coupled configuration (from the preparatory arrangement of FIG. 23), the insert coupling 700 and the body coupling 800 are pressed toward each other along the axis 901 until the thumb latch 814 (more precisely the groove engagement portion 818 of the thumb latch 814) snaps into engagement with the circumferential groove 712 defined by the insert coupling 700. As the insert coupling 700 and the body coupling 800 are pressed toward each other the groove engagement portion 818 will come into contact with the ramp surface on the outer diameter of the insert housing 710. That will force the groove engagement portion 818 of the thumb latch 814 away from the axis 901 and the cantilever spring 819 will be deflected. Then, when the groove engagement portion 818 of the thumb latch 814 is aligned with the circumferential groove 712 defined by the insert coupling 700, the cantilever spring 819 will rebound and the groove engagement portion 818 will snap into the circumferential groove 712. To unlatch the insert coupling 700 from the body coupling 800, a user can simply depress the thumb latch 814 so that the groove engagement portion 818 of the thumb latch 814 is withdrawn from the circumferential groove 712, and then separate the insert coupling 700 from the body coupling 800 along the axis 901. In some embodiments, the springs 740 and 840 will naturally assist with the uncoupling (i.e., the separation between the insert coupling 700 and the body coupling 800).

As the insert coupling 700 and the body coupling 800 are being pressed toward each other (e.g., as the arrangement of FIG. 23 is reconfigured to the arrangement of FIG. 24), the seal members 730 and 830 wipe across the projection 722 of the insert valve member 720 and the stem of the valve stem and termination member 820. These wiping actions are advantageous for multiple reasons. First, when the insert coupling 700 and the body coupling 800 are coupled together no surfaces that are exposed to the ambient ever contact areas that are wetted by a fluid contained in either of the insert coupling 700 or the body coupling 800. Accordingly, a sterile connection can be made. The same holds true when the insert coupling 700 and the body coupling 800 are uncoupled from each other, i.e., no surfaces that are exposed to the ambient ever contact areas that are wetted by a fluid. Accordingly, a sterile disconnection can be made. Moreover, no wetted surfaces are ever exposed to ambient. For these reasons, the insert coupling 700 and the body coupling 800 can, under some circumstances, be used in a sterile manner over the course of multiple cycles of connection and disconnection. In some cases, sterile wiping of the portions of the insert coupling 700 and/or the body coupling 800 may help facilitate use of the fluid couplings in a sterile manner over the course of multiple cycles of connection and disconnection.

Moreover, because the seal members 730 and 830 abut against each other, and because of the wiping actions that take place during coupling and uncoupling of the insert coupling 700 and the body coupling 800, fluid spillage is advantageously prevented during uncoupling and air inclusion is prevented when coupling.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A male fluid coupling comprising:
a housing defining an internal space, the housing having a front face and an opposite end;
a valve member slidably disposed within the internal space of the housing, the valve member comprising a projection and two or more lobes that are spaced apart from each other and that extend radially outward beyond the projection;
a seal member attached to the housing and defining a bore, wherein a portion of the seal member and a portion of the projection protrude outside of the internal space beyond the front face of the housing; and
a spring disposed within the internal space of the housing and arranged to abut against the two or more lobes to bias the valve member against the seal member such that the projection seals within a smallest inner diameter portion of the bore.

2. The male fluid coupling of claim 1, wherein the housing defines a circumferential outer groove.

3. The male fluid coupling of claim 1, wherein the opposite end of the housing is coupled with a termination member configured for interconnecting the male fluid coupling with another fluid carrying component.

4. The male fluid coupling of claim 3, wherein the termination member is configured to be snapped into engagement with the housing.

5. The male fluid coupling of claim 3, further comprising a seal disposed between the termination member and the housing to provide a fluid-tight seal therebetween.

6. The male fluid coupling of claim 1, wherein the two or more lobes comprise three lobes radially extending beyond the projection.

7. The male fluid coupling of claim 1, further comprising a spring retainer in the internal space of the housing.

8. The male fluid coupling of claim 7, wherein the spring is disposed between the spring retainer and the valve member.

9. A female fluid coupling comprising:
a housing defining an internal space, the housing having a front end configured to receive a front end portion of a male fluid coupling and an opposite end configured for connection to a second fluid carrying component;
a valve stem extending within the internal space of the housing, the valve stem defining a central lumen and two lateral openings in fluid communication with the central lumen;
a flexible seal member slidably disposed within the internal space of the housing, the seal member defining a bore in which the valve stem is slidably received; and
a spring disposed within the internal space of the housing around the valve stem, the spring arranged to bias the seal member to a closed position in which the bore of the seal member contacts around an entire periphery of the valve stem where each of the two lateral openings are defined to thereby exclusively seal the two lateral openings closed.

10. The female fluid coupling of claim 9, wherein the spring is outside of a fluid flow path defined through the female fluid coupling when coupled with the male fluid coupling.

11. The female fluid coupling of claim 9, further comprising a latch member movably coupled to the housing and defining an ovular opening configured to receive a front portion of the male fluid coupling to be mated with the female fluid coupling.

12. The female fluid coupling of claim 11, wherein the latch member comprises a cantilever spring that abuts against the housing.

13. The female fluid coupling of claim 9, wherein the opposite end of the housing is engaged with a termination retainer that mechanically attaches the valve stem to the housing.

14. The female fluid coupling of claim 13, wherein the termination retainer is a cylindrical member that snaps into engagement with the housing.

15. The female fluid coupling of claim 9, further comprising a termination member, and wherein the termination member and the valve stem are unitarily constructed.

16. The female fluid coupling of claim 9, further comprising a pair of latch members that are pivotably attached to the housing.

17. The female fluid coupling of claim 9, wherein the seal member comprises a first portion with a first diameter and a second portion with a second diameter that is smaller than the first diameter.

18. The female fluid coupling of claim 17, wherein the first portion abuts against an internal annular protrusion of the housing when the seal member is in the closed position.

19. A fluid coupling system comprising:
a male fluid coupling comprising:
a male housing defining an internal space, the male housing having a front face and an opposite end;
a valve member slidably disposed within the internal space of the male housing, the valve member comprising a projection and two or more lobes that are spaced apart from each other and that extend radially outward beyond the projection;
a seal member attached to the male housing and defining a bore, wherein a portion of the seal member and a portion of the projection protrude outside of the internal space beyond the front face of the male housing; and a male spring disposed within the internal space of the male housing and arranged to abut against the two or more lobes to bias the valve member against the seal member such that the projection seals within a smallest inner diameter portion of the bore; and a female fluid coupling comprising:

a female housing defining an internal space, the female housing having a front end configured to receive a front end portion of the male fluid coupling and an opposite end configured for connection to a second fluid carrying component;

a valve stem extending within the internal space of the female housing, the valve stem defining a central lumen and one or more lateral openings in fluid communication with the central lumen;

a flexible seal member slidably disposed within the internal space of the female housing, the seal member defining a bore in which the valve stem is slidably received; and a female spring disposed within the internal space of the female housing around the valve stem, the female spring arranged to bias the seal member to a closed position in which the bore of the seal member contacts around an entire periphery of the valve stem where each of the one or more lateral openings are defined to thereby seal the one or more lateral openings closed.

20. The fluid coupling system of claim 19, wherein the female spring is outside of a fluid flow path defined through the fluid coupling system when the male fluid coupling and the female fluid coupling are coupled together.

\* \* \* \* \*